(12) United States Patent
Kawaguchi

(10) Patent No.: US 11,710,500 B2
(45) Date of Patent: Jul. 25, 2023

(54) ABNORMALITY DEGREE CALCULATION SYSTEM AND METHOD

(71) Applicant: HITACHI, LTD., Tokyo (JP)

(72) Inventor: Yohei Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 50 days.

(21) Appl. No.: 17/205,078

(22) Filed: Mar. 18, 2021

(65) Prior Publication Data

US 2021/0390974 A1 Dec. 16, 2021

(30) Foreign Application Priority Data

Jun. 15, 2020 (JP) .................................. 2020-102909

(51) Int. Cl.
| | |
|---|---|
| *G10L 25/78* | (2013.01) |
| *G06N 3/08* | (2023.01) |
| *G10L 15/06* | (2013.01) |
| *G10L 25/30* | (2013.01) |

(52) U.S. Cl.
CPC ................ *G10L 25/78* (2013.01); *G06N 3/08* (2013.01); *G10L 15/063* (2013.01); *G10L 25/30* (2013.01)

(58) Field of Classification Search
CPC ........ G10L 25/78; G10L 15/063; G10L 25/30
USPC ....................................................... 704/200
See application file for complete search history.

(56) References Cited

U.S. PATENT DOCUMENTS

| | | | | |
|---|---|---|---|---|
| 4,816,208 A | * | 3/1989 | Woods ............... | G05B 23/0272 376/217 |
| 2019/0205234 A1 | * | 7/2019 | Moriyama ............. | G06N 20/20 |
| 2021/0278832 A1 | * | 9/2021 | Koumoto ........... | G05B 23/0218 |

FOREIGN PATENT DOCUMENTS

| | | |
|---|---|---|
| JP | 2018-095429 A | 6/2018 |
| JP | 2019-121162 A | 7/2019 |
| JP | 2020-073366 A | 5/2020 |

OTHER PUBLICATIONS

S. Akçay, A. Atapour-Abarghouei and T. P. Breckon, "Skip-GANomaly: Skip Connected and Adversarially Trained Encoder-Decoder Anomaly Detection," 2019 International Joint Conference on Neural Networks (IJCNN), Budapest, Hungary, 2019, pp. 1-8, doi: 10.1109/IJCNN.2019.8851808. (Year: 2019).*

(Continued)

*Primary Examiner* — Bharatkumar S Shah

(74) *Attorney, Agent, or Firm* — Volpe Koenig

(57) ABSTRACT

An abnormality degree calculation system includes: a feature amount vector extraction unit configured to generate and output a feature amount vector from an input signal originating from vibration of a target device; an encoding unit configured to receive as an input a set composed of the feature amount vector and a device type vector representing a type of the target device and output an encoding vector; a decoding unit configured receive as an input the encoding vector and the device type vector and output a decoding vector; a learning unit configured to learn parameters of the neural networks of the encoding unit and the decoding unit; and an abnormality degree calculation unit configured to calculate a degree of abnormality defined as a function of the feature amount vector from the feature amount vector extraction unit, the encoding vector from the encoding unit, and the decoding vector from the decoding unit.

16 Claims, 29 Drawing Sheets

(56) References Cited

OTHER PUBLICATIONS

Wang Xuejun, Xu Yong and Chen Hexin, "An adaptive neural network vector quantization algorithm and its implementation based on TMS320C30 in color image coding," Proceedings of the IEEE International Vehicle Electronics Conference (IVEC'99) (Cat. No. 99EX257), 1999, pp. 265-267 vol. 1, doi: 10.1109/IVEC (Year: 1999).*

* cited by examiner

ABNORMALITY DEGREE CALCULATION SYSTEM AND METHOD

BACKGROUND

The present invention relates to an abnormality degree calculation system and method.

In general, since a state such as an abnormality or a sign of failure of equipment often becomes evident as a sound generated by the equipment, it is important to detect an abnormal sound on the basis of the operating sound of the equipment. Detection of abnormal sound is performed by an abnormality degree calculation system that determines whether the degree of abnormality calculated from the sound exceeds a threshold value. However, in order to calculate the degree of abnormality with high accuracy for a plurality of machine models, a huge amount of learning data is required for each machine model. Therefore, there are requirements for being able to calculate the degree of abnormality with high accuracy for a plurality of machine models and being able to reduce the number of learning data samples required for each machine model.

Japanese Patent Application Publication No. 2019-121162 discloses technology relating to "including a variable selection unit that selects a context variable to be used when detecting abnormalities in determination target data from context variables on the basis of a content variable serving as an abnormality detection target, reference data including a context variable indicating a condition when the content variable has been obtained, and the value of the context variable included in the determination target data including the content variable and the context variable".

SUMMARY

According to one embodiment of the invention disclosed in Japanese Patent Application Publication No. 2019-121162, a set of operating conditions called "context variables" and a set of abnormality detection target sensor data called "content variables" are input to perform abnormality detection. Although not described in Japanese Patent Application Publication No. 2019-121162, if the time-series of a calculated feature amount of an operating sound can be input as "content variables" in Japanese Patent Application Publication No. 2019-121162, it may be possible to detect abnormal sound of equipment. However, it has to be noted that this description does not state that Japanese Patent Application Publication No. 2019-121162 can be applied to the detection of abnormal operating sound (abnormal sound) of equipment, and is merely an assumption.

However, even if the above assumption holds, it is not possible to calculate the degree of abnormality with high accuracy for a plurality of machine models and to calculate the degree of abnormality with a small number of necessary learning data samples per machine model. This is because the normal sound across a plurality of machine models is diverse and distributed in a complex manner, and therefore, in order to learn the distribution of the normal sound, a large number of learning data samples are required for each machine model.

Further, even if the machine model can be input as the "context variable" in Japanese Patent Application Publication No. 2019-121162, it is not possible to calculate the degree of abnormality with high accuracy across a plurality of machine models, and to calculate the degree of abnormality with a small number of necessary learning data samples per machine model. This is because this method assigns different independent distributions to different positions of the axis of the context variable for each machine model in order to model normal sound. Although it is possible to add a new axis ("context variable"), i.e., the machine model, to the sample that cannot be distinguished from normal and abnormal only by the sound ("content variable"), this is equivalent to preparing a number of different independent models corresponding to the number of machine models, hence a large number of learning data samples are required.

Japanese Patent Application Publication No. 2018-95429 and Japanese Patent Application Publication No. 2020-73366 also disclose techniques for preparing different models independently for each condition. Therefore, as described above for Japanese Patent Application Publication No. 2019-121162, it is not possible to calculate the degree of abnormality with high accuracy across a plurality of machine models, and to calculate the degree of abnormality with a small number of necessary learning data samples per machine model.

The present invention has been made in view of the above problems, and an object of the present invention is to provide an abnormality degree calculation system and a method capable of calculating the degree of abnormality with respect to a plurality of types of target devices on the basis of signals originating from vibration of a target device.

In order to solve the problems, an abnormality degree calculation system according to one aspect of the present invention is an abnormality degree calculation system calculating a degree of abnormality of a target device, including: a feature amount vector extraction unit configured to generate and output a feature amount vector from an input signal originating from vibration of the target device; an encoding unit which is a neural network and configured to receive as an input a set composed of the feature amount vector and a device type vector representing a type of the target device and output an encoding vector; a decoding unit which is a neural network and configured to receive as an input the encoding vector and the device type vector and output a decoding vector; a learning unit configured to learn parameters of the neural network of the encoding unit and parameters of the neural network of the decoding unit so as to minimize a predetermined loss function defined as a function of the feature amount vector from the feature amount vector extraction unit, the encoding vector from the encoding unit, and the decoding vector from the decoding unit; and an abnormality degree calculation unit configured to calculate the degree of abnormality defined as the function of the feature amount vector from the feature amount vector extraction unit, the encoding vector from the encoding unit, and the decoding vector from the decoding unit.

According to the present invention, it is possible to calculate the degree of abnormality from signals originating from the vibration of a plurality of types of target devices.

BRIEF DESCRIPTION OF THE DRAWINGS

FIG. 3 is an explanatory diagram illustrating the relationship between a feature amount vector, an encoding vector, a decoding vector, and the like;

FIG. 23 is an explanatory diagram illustrating a relationship between a feature amount vector, an encoding vector, a decoding vector, and the like;

FIG. 26 is an explanatory diagram illustrating a relationship between a feature amount vector, an encoding vector, a decoding vector, and the like;

DETAILED DESCRIPTION OF THE EMBODIMENT

Figure 1:
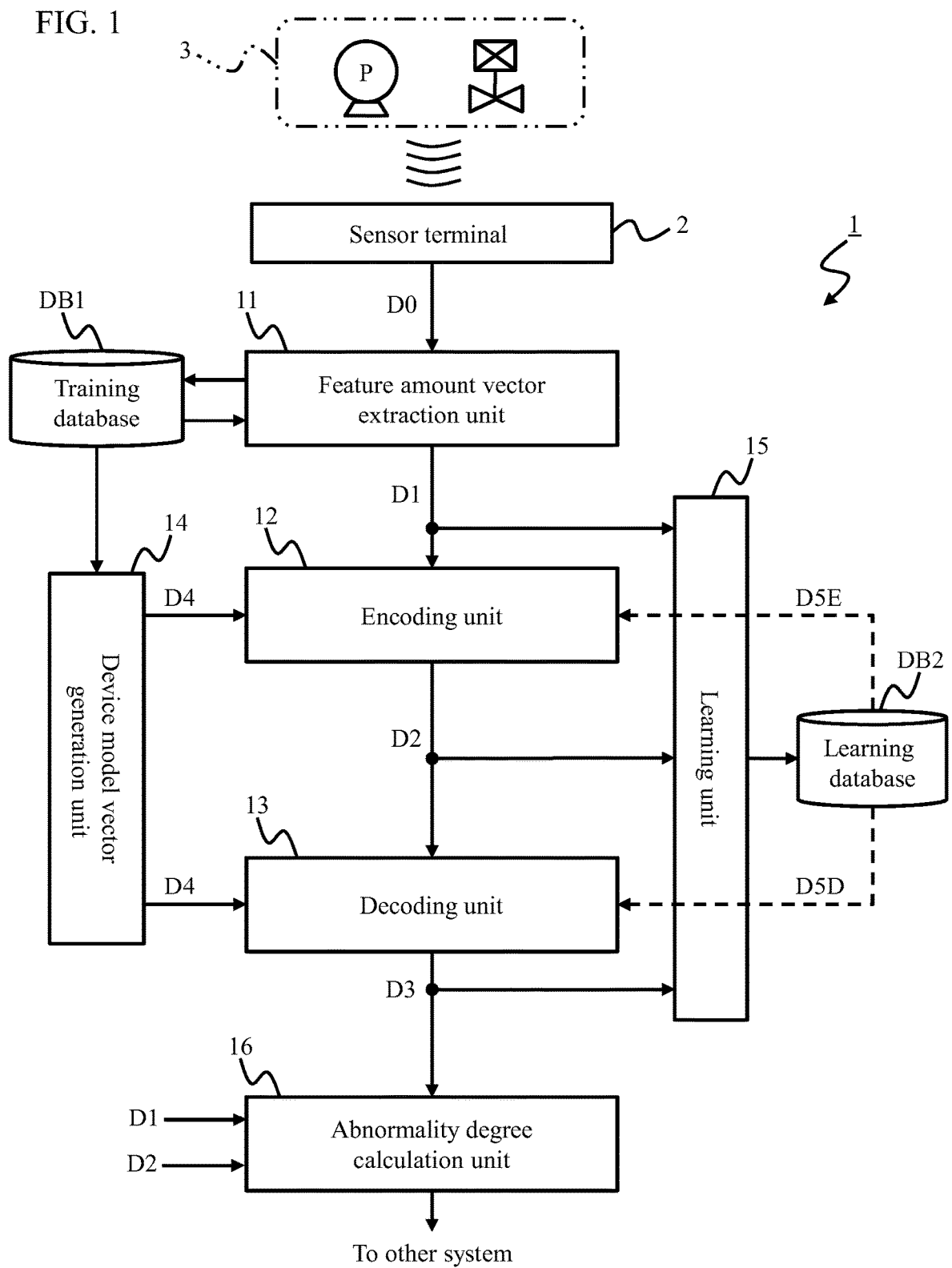
FIG. 1 is an explanatory diagram illustrating an overall outline of the present embodiment.

Hereinafter, embodiments of the present invention will be described with reference to the drawings. For example, an abnormality degree calculation system according to the present embodiment includes a feature amount vector extraction unit 11 that receives a signal D0 originating from vibration of a target device and outputs a feature amount vector D1; an encoding unit 12 which is a neural network that receives a set composed of the feature amount vector D1 and a device model vector D4 representing a model of the target device 3 and outputs an encoding vector D2; a decoding unit 13 which is a neural network that receives the encoding vector D2 and the device model vector D4 representing the model of the target device 3 and outputs the decoding vector D3; a learning unit 15 that updates parameters of the neural network of the encoding unit 12 and parameters of the neural network of the decoding unit 13 so as to minimize a loss function defined by a function of the feature amount vector D1, the encoding vector D2, and the decoding vector D3; and an abnormality degree calculation unit 16 that calculates a degree of abnormality which is a function of the feature amount vector D1, the encoding vector D2, and the decoding vector D3. In the following description, the device 3 which is an abnormality degree calculation target is sometimes abbreviated as the device 3. The learning unit 15 can also be called, for example, a neural network parameter updating unit.

According to the present embodiment, since the device model vector D4 is input to both the encoding unit 12 and the decoding unit 13, the decoding vector D3 can be predicted with high accuracy even when the information of the device model vector D4 does not remain in the encoding vector D2.

Therefore, as the learning unit 15 repeats a learning process, the compression efficiency of the encoding vector D2 gradually improves, and the information of the device model vector D4 disappears from the encoding vector D2. As a result, the parameters of the encoding unit 12 and the parameters of the decoding unit 13 are learned so that the encoding vector D2 has a common distribution regardless of the model of the device 3.

In the present embodiment, the encoding vector D2 has a common distribution regardless of the model of the device 3. Therefore, in the present embodiment, since mapping in the neural network is shared as much as possible in order to express the features of sound common between the device models, the size of a parameter space that needs to be searched in the learning process can be reduced. As a result, according to the present embodiment, the optimization of the learning process is facilitated.

In the present embodiment, the degree of abnormality of the device 3 can be calculated on the basis of the signal originating from the vibration generated by the device 3, and whether an abnormality has occurred in the device 3 can be determined from the calculated degree of abnormality. The signal originating from vibration includes a vibration signal and a sound signal. By replacing a sensor terminal 2 used in the present embodiment with an acceleration sensor or a displacement sensor from a microphone, the abnormality degree calculation system 1 of the present embodiment can calculate the abnormality degree from the vibration signal.

The target device 3 is, for example, a valve, a sliding device, a robot, a pump, a blower, a cylinder, a conveyor, a motor, a transmission, and the like. The device 3 is a machine, factory equipment, home appliances, and the like. In the present embodiment, the degree of abnormality can be calculated for the device 3 whose normal sound can change suddenly.

First Embodiment

A first embodiment will be described with reference to FIGS. 1 to 9. FIG. 1 is an explanatory diagram illustrating an overall outline of the present embodiment. The details of the configuration of the abnormality degree calculation system 1 will be described later. Here, the overall configuration will be briefly described first.

In the abnormality degree calculation system 1, for example, the sensor terminal 2 detects a sound signal D0 generated by a plurality of types of target devices 3 and inputs the same to a feature amount vector extraction unit 11. The feature amount vector extraction unit 11 extracts a feature amount vector D1 from the input signal D0 and outputs the same.

The encoding unit 12 generates an encoding vector D2 on the basis of the feature amount vector D1 input from a feature amount vector extraction unit 11 and a device model vector D4 input from a device model vector generation unit 4. The encoding vector D2 can also be called a "latent expression vector" as an example.

The device model vector D4 is a kind of a device type vector that identifies the type of the target device 3, and is a One-Hot vector generated from the model of the device 3. The One-Hot vector is a vector notation in which only one predetermined element of all elements of the vector is "1" and the other elements are "0" (see FIG. 7). As will be apparent from other embodiments described later, the device type vector may include a device category vector D7 in addition to the device model vector D4. The device category is a superordinate concept including a model belonging to the same type of device, and is a classification of the device 3.

The use of the One-Hot vector for the device model vector D4 has an effect of preventing a decrease in accuracy due to the order relationship of models. For example, when the order relationship of the models is simply the order in which models are registered, although the numbers of model 1 and model 2 are adjacent to each other, and the numbers of model 1 and model 7 are separated from each other, it cannot be said that the sound of model 2 is more similar to the sound of model 1 than the sound of model 7. However, if a vector that depends on the order relationship is used for the device model vector D4 instead of the One-Hot vector, there is a high possibility that the processing is biased such that model 2 is more similar to model 1 than model 7, and it is difficult to optimize the learning process. In contrast, when the One-Hot vector is used, since the distances of the vectors between the models are equal, the models can be treated equally regardless of the order relationship.

Similarly, the use of the One-Hot vector for the device category vector D7 has an effect of preventing a decrease in accuracy due to the order relationship of device categories. For example, when the order relationship of the device categories is simply the order in which the device categories are registered, although the number of device category 1 and device category 2 are adjacent to each other, and the number of device category 1 and device category 7 are separated from each other, it cannot be said that the sound of device category 2 is more similar to the sound of device category 1 than the sound of device category 7. However, if a vector that depends on the order relationship is used for the device category vector D7 instead of the One-Hot vector, there is a high possibility that the processing is biased such that device category 2 is more similar to device category 1 than device category 7, and it is difficult to optimize the learning process. In contrast, when the One-Hot vector is used, since the distances of the vectors between the device categories are equal, the device categories can be treated equally regardless of the order relationship.

The device model vector D4 may be a binary vector which is not the One-Hot vector and in which each element is 0 or 1. At this time, the permutations of 0 and 1 correspond to each model of the device 3. For example, the number of dimensions of the device model vector D4 is 3, the device model vector D4 corresponding to the first model is (0, 0, 1), the device model vector D4 corresponding to the second model is (0, 1, 0), the device model vector D4 corresponding to the third model is (0, 1, 1), and the device model vector D4 corresponding to the fourth model is (1, 0, 0), the device model vector D4 corresponding to the fifth model is (1, 0, 1), the device model vector D4 corresponding to the sixth model is (1, 1, 0), and the device model vector D4 corresponding to the seventh model is (1, 1, 1). The number of elements that receive the input of the device model vector D4 in the input layer of the encoding unit and the number of elements that receive the input of the device model vector D4 in the input layer of the decoding unit can be suppressed by the logarithmic order as compared to the One-Hot vector. Therefore, when the number of device models is very large, there is an effect of reducing the number of parameters of the neural network and the amount of memory required for execution. Further, a fixed-length bit sequence generated by an appropriate hash function that receives the name or number of a device model may be the device model vector D4. The hash function may be a known hash function such as a remainder hash. In this case, it is possible to reduce the decrease in accuracy due to the order relationship of models.

Similarly to the device model vector D4, the device category vector D7 may be a binary vector which is not the One-Hot vector and in which each element is 0 or 1. At this time, the permutations of 0 and 1 correspond to each device category of the device 3. For example, the number of dimensions of the device category vector D7 is 3, the device category vector D7 corresponding to the first device category is (0, 0, 1), the device category vector D7 corresponding to the second device category is (0, 0, 1), the device category vector D7 corresponding to the third device category is (0, 1, 1), the device category vector D7 corresponding to the fourth device category is (1, 0, 0), the device category vector D7 corresponding to the fifth device category is (1, 0, 1), the device category vector D7 corresponding to the sixth device category is (1, 1, 0), and the device category vector D7 corresponding to the seventh device category is (1, 1, 1). The number of elements that receive the input of the device category vector D7 in the input layer of the encoding unit and the number of elements that receive the input of the device category vector D7 in the input layer of the decoding unit can be suppressed by the logarithmic order as compared to the One-Hot vector. Therefore, when the number of device categories is very large, there is an effect of reducing the number of parameters of the neural network and the amount of memory required for execution. Further, a fixed-length bit sequence generated by an appropriate hash function that receives the name or number of the device category may be the device category vector D7. The hash function may be a known hash function such as a remainder hash. In this case, it is possible to reduce the decrease in accuracy due to the order relationship of device categories.

The decoding unit 13 generates and outputs a decoding vector D3 on the basis of the encoding vector D2 output from the encoding unit 12 and the device model vector D4 generated by the device model vector generation unit 14.

The abnormality degree calculation unit 16 calculates the degree of abnormality of the device 3 from the feature amount vector D1, the encoding vector D2, and the decoding vector D3. The calculated degree of abnormality can also be provided to other systems such as an abnormality detection system, a diagnostic system, and a production control system.

The learning unit 15 learns parameters D5E of the neural network of the encoding unit 12 and parameters D5D of the neural network of the decoding unit 13 so as to minimize a predetermined loss function defined as a function of the feature amount vector D1 from the feature amount vector extraction unit 11, the encoding vector D2 from the encoding unit 12, and the decoding vector D3 from the decoding unit 13.

Figure 2:
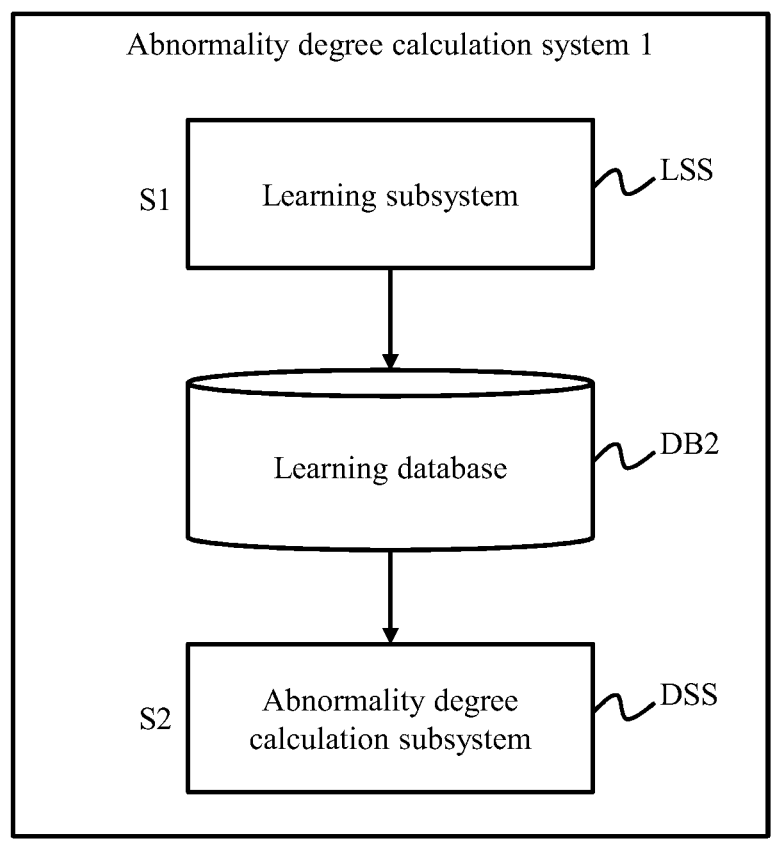
FIG. 2 is a block configuration diagram of an abnormality degree calculation system.

FIG. 2 is a block configuration diagram illustrating the entire abnormality degree calculation system 1. The abnormality degree calculation system 1 can be roughly divided into a learning subsystem LSS and an abnormality degree calculation subsystem DSS. The learning subsystem LSS learns the parameters D5E of the neural network of the encoding unit 12 and the parameters D5D of the neural network of the decoding unit 13 (S1), and stores the same in a learning database DB2. The abnormality degree calculation subsystem DSS calculates the degree of abnormality using the parameters read from the learning database DB2 (S2).

Figure 3:
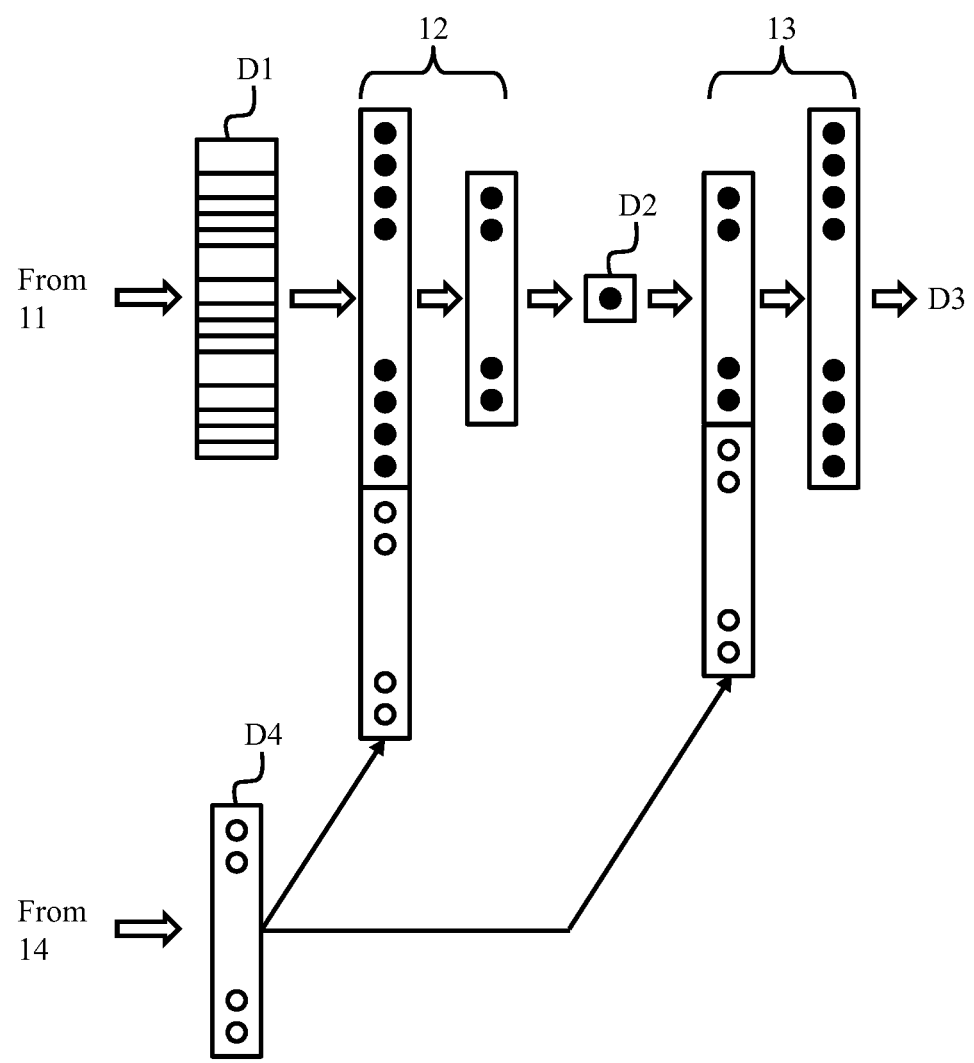

FIG. 3 is an explanatory diagram illustrating the relationship between the feature amount vector D1, the encoding vector D2, and the decoding vector D3.

Figure 7:
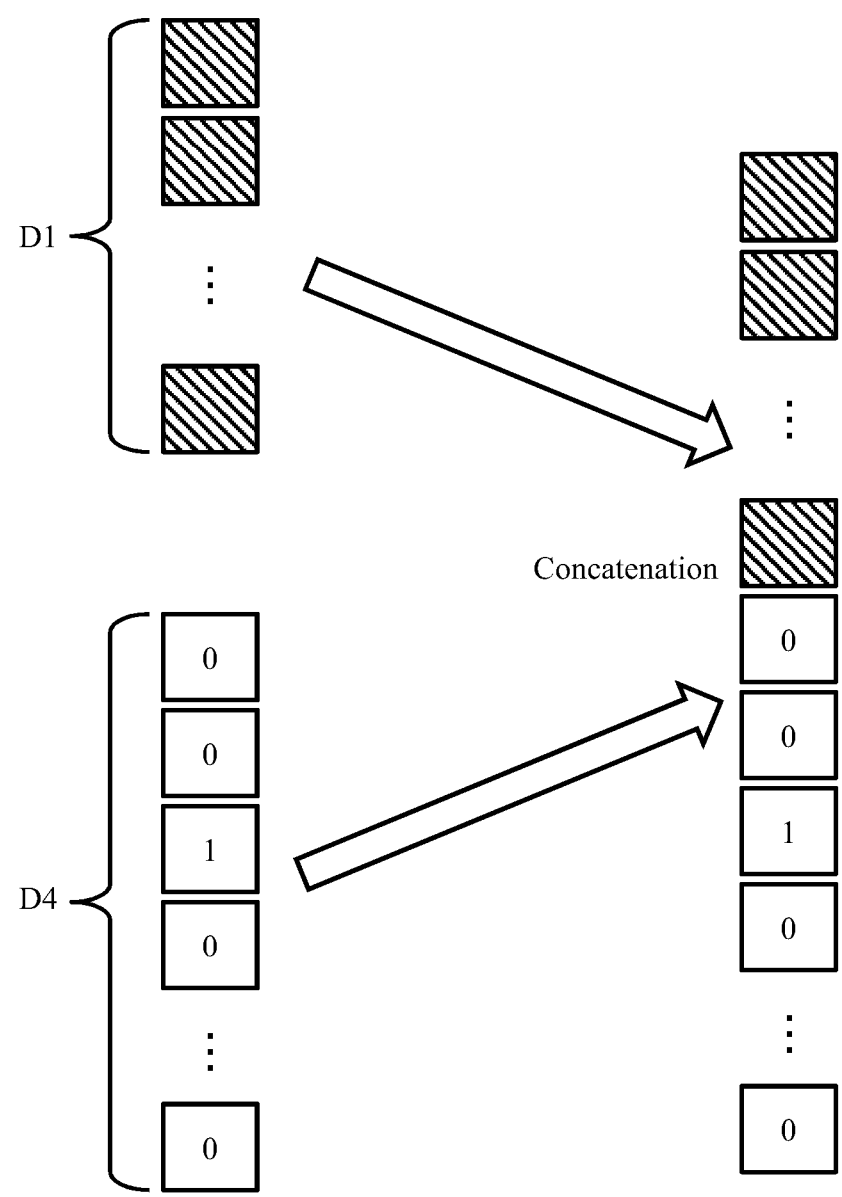
FIG. 7 is an explanatory diagram illustrating a method of creating a vector input to a neural network.

As illustrated in FIG. 7, the feature amount vector D1 from the feature amount vector extraction unit 11 and the device model vector D4 from the device model vector generation unit 14 are concatenated to form one vector, which is input to the encoding unit 12.

Return to FIG. 3, the encoding vector D2 generated by the encoding unit 12 is input to the decoding unit 13. Then, the device model vector D4 is also input to the decoding unit 13 similarly to the encoding unit 12. The decoding unit 13 generates and outputs the decoding vector D3.

Figure 4:
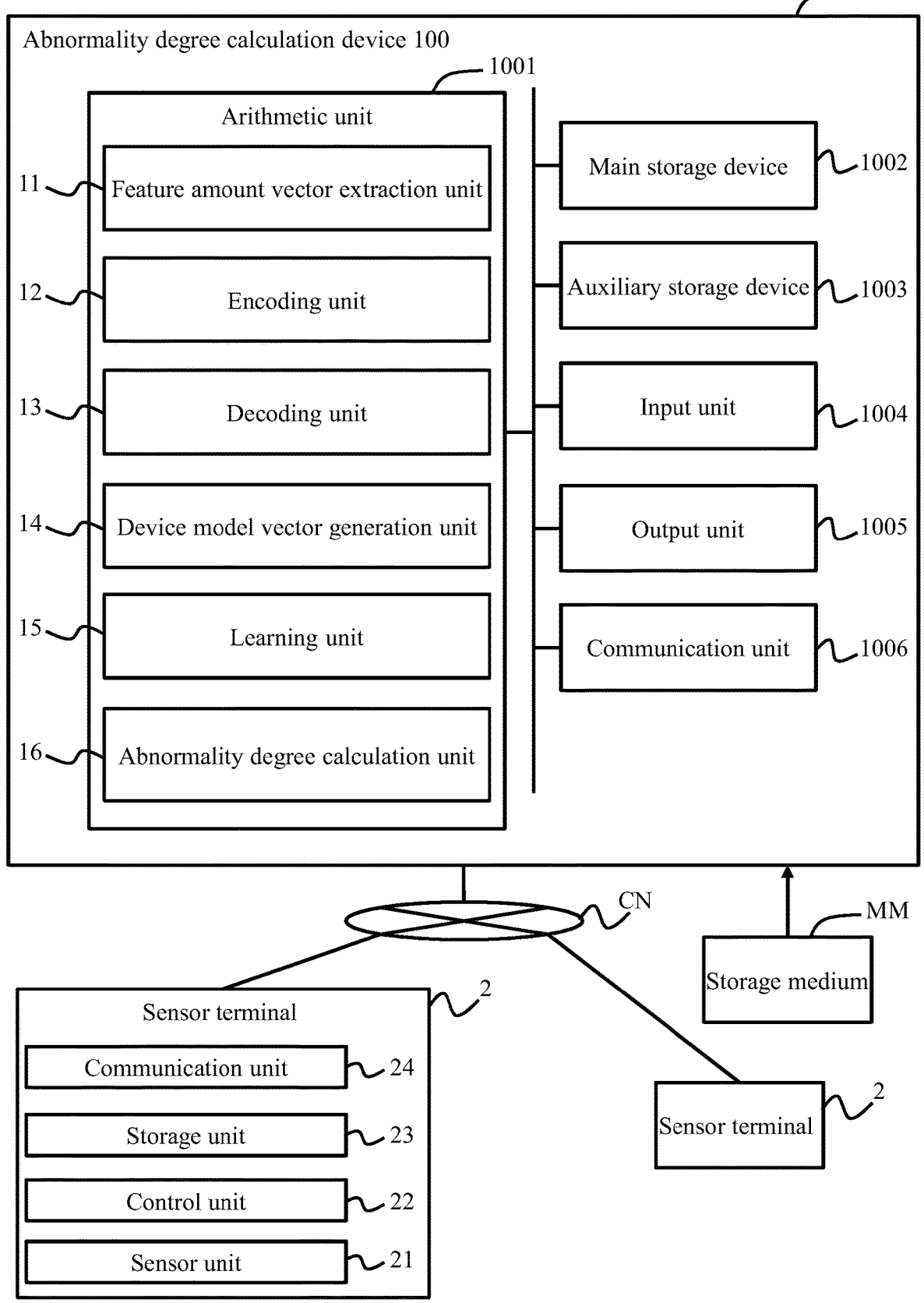
FIG. 4 is a hardware and software configuration diagram of an abnormality degree calculation device.

FIG. 4 is a hardware and software configuration diagram of the abnormality degree calculation device 100. By causing a computer to execute a predetermined computer program, the computer can be used as the abnormality degree calculation device 100. FIG. 4 illustrates an example in which the abnormality degree calculation device 100 is configured from one computer, but instead, one or a plurality of abnormality degree calculation devices 100 may be formed from a plurality of computers. The computer may be a virtual computer.

The abnormality degree calculation device 100 is connected to one or more sensor terminals 2 via a communication network CN.

The sensor terminal 2 is configured as, for example, a portable sound recording terminal. The sensor terminal 2 and the abnormality degree calculation device 1 may be integrated. For example, the abnormality degree calculation device 1 having a sound recording function may be configured as a portable device. In this case, the sensor terminal 2 becomes unnecessary.

The abnormality degree calculation device 100 is, for example, a computer including an arithmetic unit 1001, a main storage device 1002, an auxiliary storage device 1003, an input unit 1004, an output unit 1005, and a communication unit 1006.

The arithmetic unit 1001 includes one or a plurality of microprocessors, and reads a predetermined computer program stored in the auxiliary storage device 1003 into the main storage device 1002 and executes the program, whereby the functions of the feature amount vector extraction unit 11, the encoding unit 12, the decoding unit 13, the device model vector generation unit 14, the learning unit 15, and the abnormality degree calculation unit 16 as described in FIG. 1 are realized.

The input unit 1004 can include, for example, a keyboard, a touch panel, a pointing device, and the like, and accepts the input from a user who uses the abnormality degree calculation device 100. The output unit 1005 can include, for example, a monitor display, a speaker, a printer, and the like, and provides information to the user.

The communication unit 1006 communicates with the sensor terminal 2 via the communication network CN. The communication unit 1006 can also communicate with another computer (not illustrated).

A storage medium MM is, for example, a storage medium such as a flash memory or a hard disk, and transfers and stores a computer program or data to the abnormality degree calculation device 100, and reads and stores the computer program or data from the abnormality degree calculation device 100. The storage medium MM may be directly connected to the abnormality degree calculation device 100, or may be connected to the abnormality degree calculation device 100 via the communication network CN.

The configuration of the sensor terminal 2 will be described. The sensor terminal 2 includes, for example, a sensor unit 21, a control unit 22, a storage unit 23, and a communication unit 24.

The sensor unit 21 is a microphone that detects the sound of the target device 3. Therefore, in the following, the sensor unit 21 may be referred to as a microphone 21. The sound data detected by the sensor unit 21 is stored in the storage unit 23. The control unit 22 that controls the sensor terminal 2 transmits the sound data stored in the storage unit 23 to the abnormality degree calculation device 100.

By changing the sensor unit 21 from a microphone to an acceleration sensor or the like, the sensor terminal 2 can detect the vibration of the target device 3. Then, the abnormality degree calculation device 100 can calculate the degree of abnormality on the basis of the vibration of the target device 3.

Figure 5:
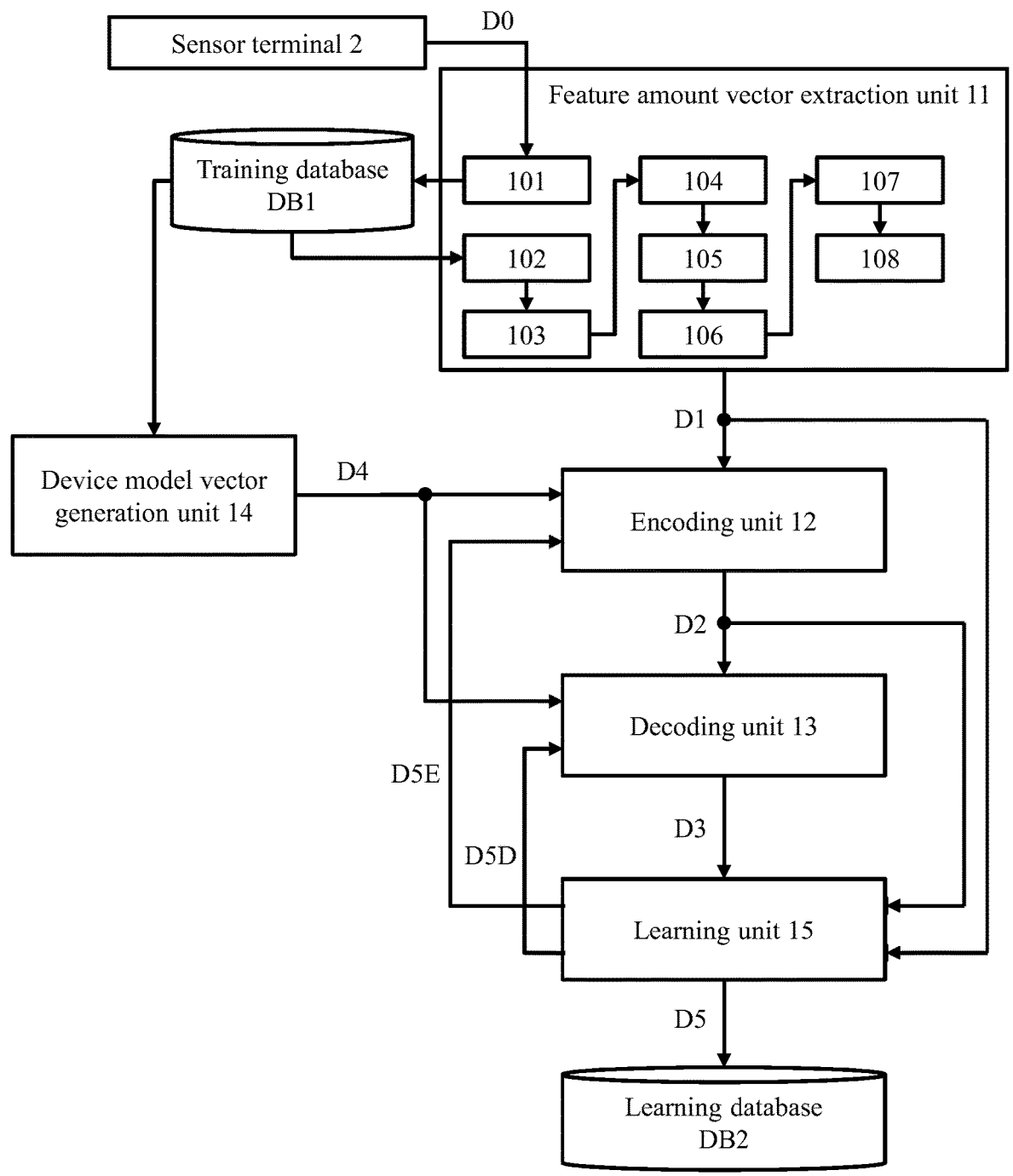
FIG. 5 is a block configuration diagram of a learning subsystem.
Figure 6:
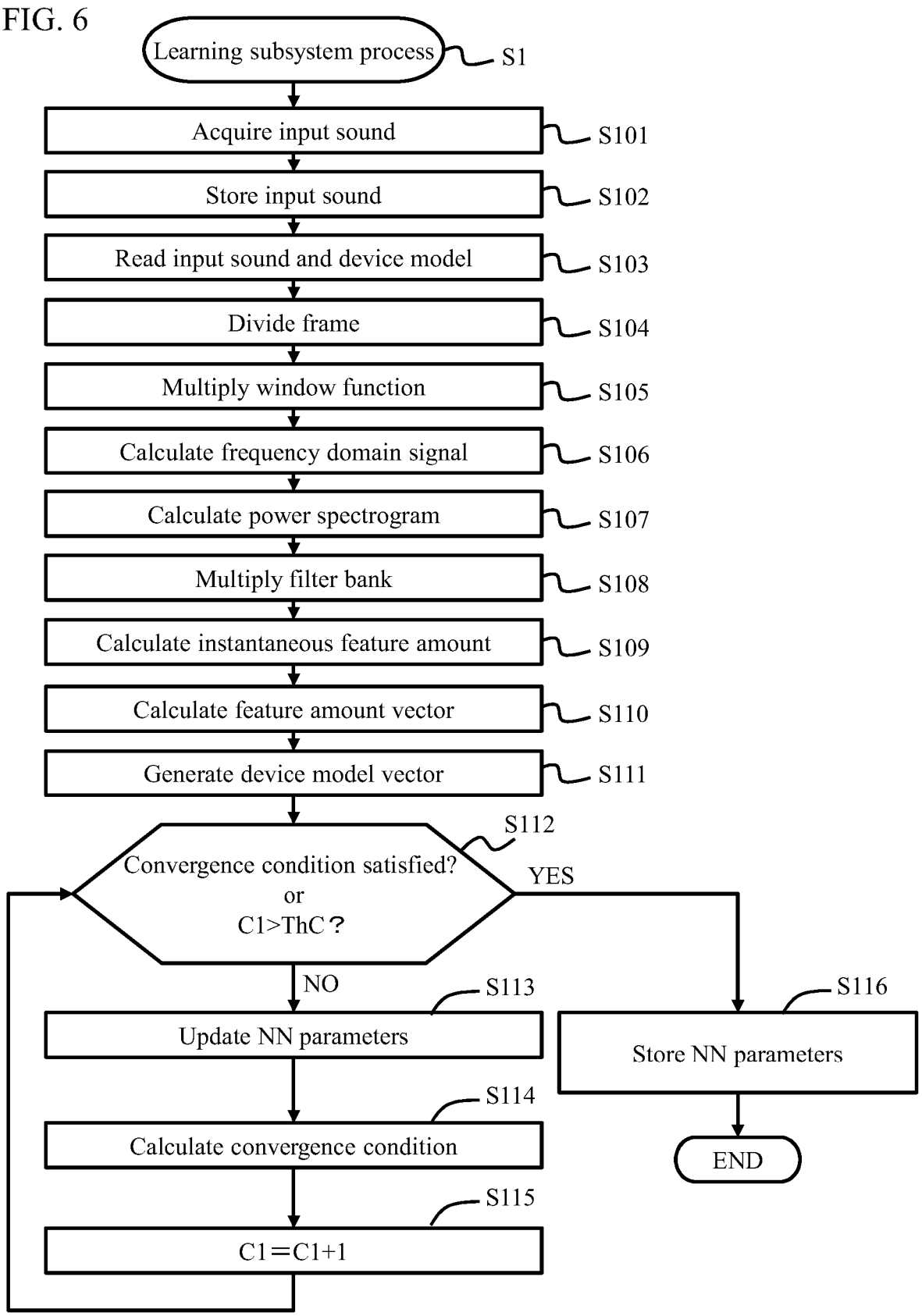
FIG. 6 is a processing flow of the learning subsystem.

FIG. 5 is a block configuration diagram of the learning subsystem LSS. FIG. 6 is a processing flow of the learning subsystem LSS. This will be described with reference to FIGS. 5 and 6. A variational auto-encoding unit (VAE)-type configuration will be described later.

First, the configuration of the feature amount vector extraction unit 11 will be described. The input sound acquisition unit 101 converts an analog input signal input from the microphone 21 into a digital input signal with the aid of an A/D (analog/digital) converter (S101), and stores the same in a training digital input signal database DB1 (S102).

The frame division unit 102 divides the digital input signal in a specified number of time points (hereinafter, frame size) with respect to the digital input signal extracted from the training digital input signal database DB1, and outputs a frame signal (S104). The frames may overlap.

A window function multiplication unit 103 outputs a window function multiplication signal by multiplying the input frame signal s by a window function (S105). For the window function, for example, a Hanning window is used.

A frequency domain signal calculation unit 104 outputs a frequency domain signal by performing a short-time Fourier transform on the input signal after window function multiplication (S106). If the frame size is N, the frequency domain signal is a set of M complex numbers, in which one complex number corresponds to each of M frequency best individuals (M=(N/2+1)). The frequency domain signal calculation unit 104 may also use a frequency conversion method such as a consistent Q conversion (CQT) instead of the short-time Fourier transform.

A power spectrogram calculation unit 105 outputs a power spectrogram on the basis of the input frequency domain signal (S107). A filter bank multiplication unit 106 outputs a Mel power spectrogram by multiplying the input power spectrogram by the Mel filter bank (S108). The filter bank multiplication unit 106 may use a filter bank such as a ⅓ octave band filter instead of the Mel filter bank.

An instantaneous feature amount calculation unit 107 outputs a logarithmic Mel power spectrogram by applying a logarithm to the input Mel power spectrogram (S109). Instead of the logarithmic Mel power spectrogram, the Mel frequency cepstrum coefficient (MFCC) may be calculated. In that case, instead of the filter bank multiplication unit 106 and the logarithmic calculation unit 107, the logarithmic value of the power spectrogram is calculated, the filter bank is multiplied, the discrete cosine transform is performed, and the MFCC is output.

A feature amount time-series calculation unit 108 outputs the feature amount vector D1 by concatenating adjacent L frames to the input logarithmic Mel power spectrogram or the MFCC (S110). Instead of the logarithmic Mel power spectrogram or the MFCC, the time-series (delta) of their time difference or time derivative may be input, and the adjacent L frames may be concatenated and the feature amount vector D1 may be output.

By inputting the time-series (delta delta) of the time difference of the time derivative of the time-series of the time difference or the time derivative, the adjacent L frames may be concatenated and the feature amount vector D1 may be output. Further, the feature amount vector D1 may be output by concatenating the adjacent L frames to a selected combination thereof concatenated in the feature amount axis direction. The feature amount vector D1 generated by the feature amount vector extraction unit 11 is input to the encoding unit 12 and the learning unit 15.

In the present embodiment, the device model vector generation unit 14 generates the device model vector D4, which is input to the encoding unit 12 and the decoding unit 13 (S111).

The encoding unit 12 generates the encoding vector D2 on the basis of the feature amount vector D1 and the device model vector D4 from the device model vector generation unit 14. The generated encoding vector D2 is input to the decoding unit 13.

The decoding unit 13 generates the decoding vector D3 on the basis of the encoding vector D2 and the device model vector D4.

The learning unit 15 repeatedly learns the parameters D5E of the neural network of the encoding unit 12 and the parameters D5D of the neural network of the decoding unit 13 so as to minimize the value of a predetermined loss function defined as a function of the feature amount vector D1, the encoding vector D2, and the decoding vector D3 (S112 to S115). These parameters D5E and D5D are stored in the learning database DB2 (S116).

That is, the learning unit 15 determines whether a convergence condition is satisfied or whether the number of iterations C1 of this process exceeds an upper-limit value ThC (S112).

When the convergence condition is not satisfied, or when the number of iterations C1 is equal to or less than the upper-limit value ThC, the learning unit 15 updates the parameters D5E and D5D of the neural networks (S113), calculates the convergence condition (S114), increments the number of iterations C1 by 1, and returns to step S112.

The learning unit 15 stores the parameters D5E and D5D of the neural networks in the learning database DB2 (S116).

Figure 8:
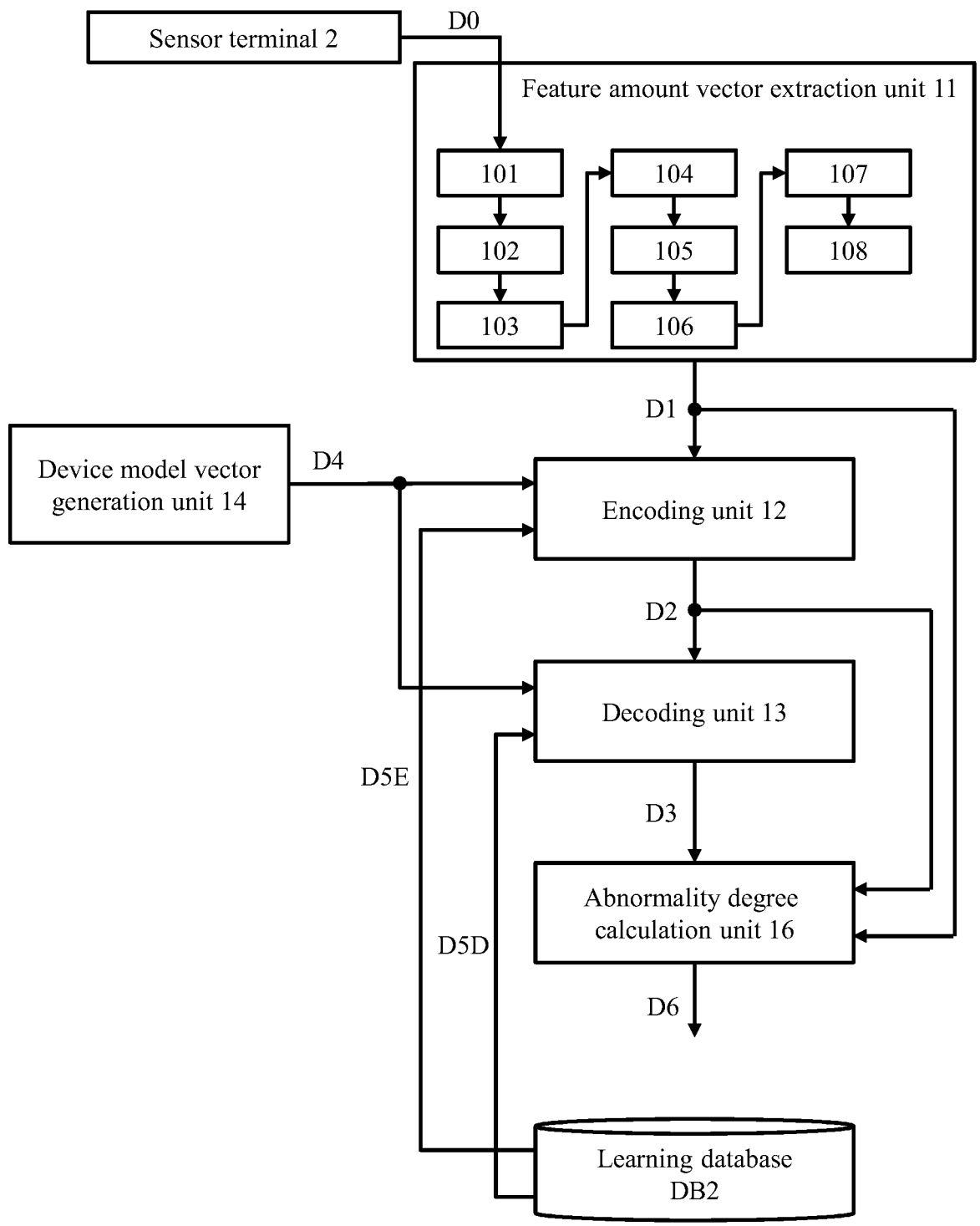
FIG. 8 is a block configuration diagram of an abnormality degree calculation subsystem.
Figure 9:
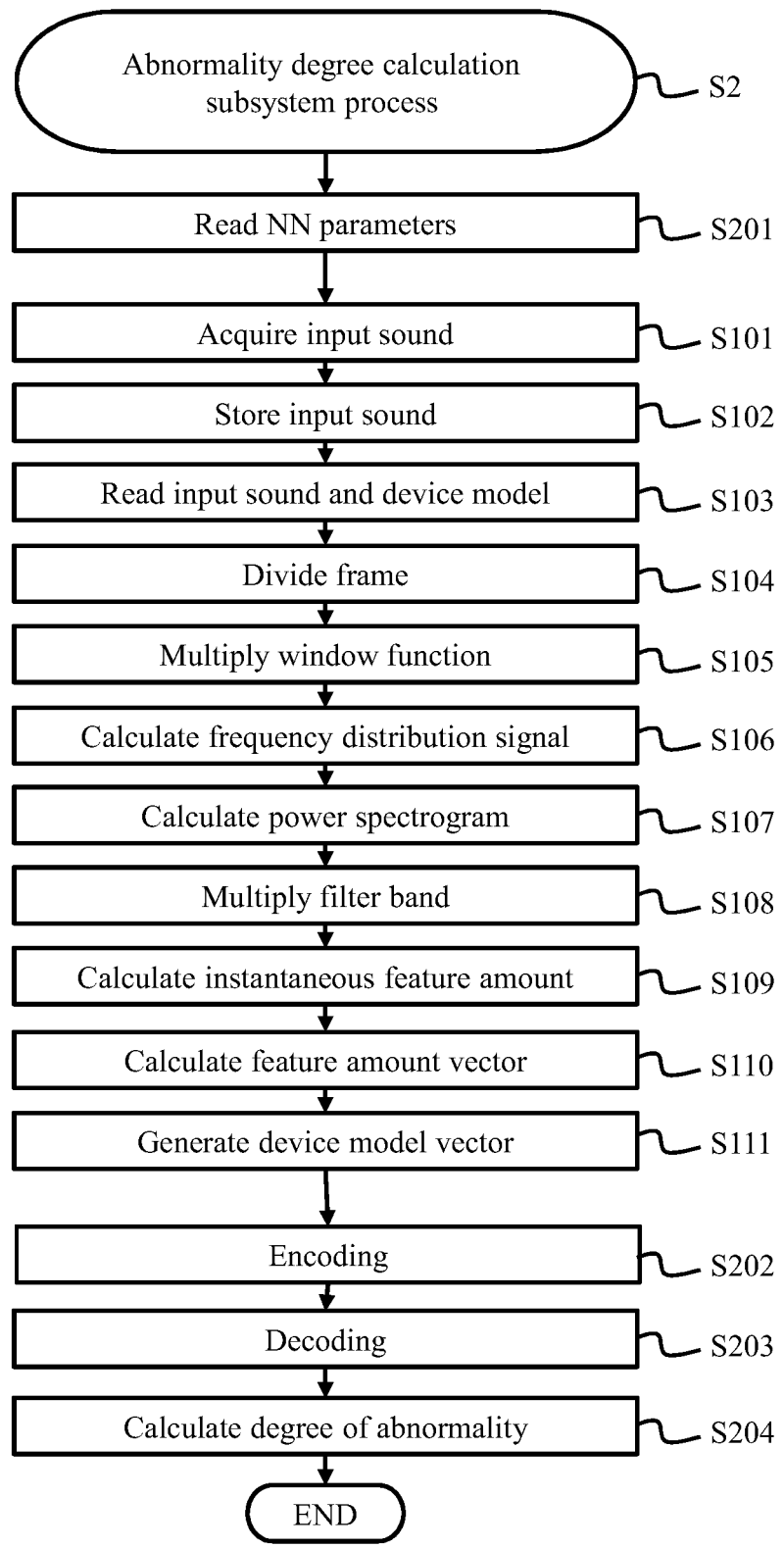
FIG. 9 is a processing flow of the abnormality degree calculation subsystem.

FIG. 8 is a block configuration diagram of the abnormality degree calculation subsystem DSS. FIG. 9 is a processing flow of the abnormality degree calculation subsystem DSS. This will be described with reference to FIGS. 8 and 9.

The abnormality degree calculation subsystem DSS has the abnormality degree calculation unit 16 instead of the learning unit 15, and does not use the training database DB1.

When the degree of abnormality of the feature amount vector D1 extracted from the input signal D0 is calculated, the encoding unit 12 reads the parameters D5E from the learning database DB2, and the decoding unit 13 also reads the parameters D5D from the learning database DB2 (S201).

Since the details of steps S101 to S111 have already been described, redundant description will be omitted. In these steps S101 to S111, the feature amount vector D1 for the sound signal D0 detected from the target device 3 is generated, and is input to the neural network of the encoding unit 12 together with the device model vector D4 of the target device 3. In the following description, redundant description will be omitted.

The encoding unit 12 generates the encoding vector D2 from the feature amount vector D1 and the device model vector D4, and inputs the encoding vector D2 to the decoding unit 13 (S202). The decoding unit 13 generates the decoding vector D3 from the device model vector D4 and the encoding vector D2 and outputs the decoding vector D3 to the abnormality degree calculation unit 16 (S203).

The abnormality degree calculation unit 16 calculates the degree of abnormality of the sound signal D0 of the target device 3 on the basis of the feature amount vector D1, the encoding vector D2, and the decoding vector D3, and outputs the calculation result D6 (S204).

Here, a variational auto-encoder (VAE)-type configuration is disclosed. The encoding unit 12 is a multi-layer neural network, and the input layer thereof includes a number of elements corresponding to the sum of the number of dimensions of the feature amount vector and the number of dimensions of the device model vector, and these elements receive the elements of a vector obtained by concatenating the feature amount vector and the device model vector. The input layer is concatenated to a second layer including an appropriate number of elements (for example, the same number as the number of elements in the input layer) with a non-linear activation function (for example, a ramp function) disposed therebetween. The second layer is also concatenated to a third layer including an appropriate number of elements (for example, the same number as the number of elements in the input layer) with a non-linear activation function disposed therebetween. The second and subsequent layers that are concatenated in multiple layers in this way are called intermediate layers. The end of the intermediate layers of the encoding unit includes 2Q elements, which is twice the number of dimensions Q of the encoding vector. These elements are divided in half into Q, and the output values of the elements are defined as $\mu\_1, \mu\_2, \ldots, \mu\_Q$, $\sigma\_1, \sigma\_2, \ldots,$ and $\sigma\_Q$.

Here, a column vector having $\mu\_1, \mu\_2, \ldots,$ and $M\_Q$ in each element is defined as $\mu$, and a diagonal matrix having $\sigma\_1, \sigma\_2, \ldots,$ and $\sigma\_Q$ in each element of diagonal components is defined as $\Sigma$. Then, the final layer of the encoding unit probabilistically generates an encoding vector z having the number of dimensions Q according to a multidimensional normal distribution $N(z; \mu, \Sigma)$ in which $\mu$ is the average and $\Sigma$ is the covariance matrix.

The decoding unit 13 is a multi-layer neural network, and the input layer thereof includes a number of elements corresponding to the sum of the number of dimensions Q of the encoding vector and the number of dimensions of the device model vector, and these elements receive the elements of a vector obtained by concatenating the encoding vector and the device model vector. The input layer is concatenated to a second layer including an appropriate number of elements (for example, the same number as the number of elements in the input layer) with a non-linear activation function (for example, a ramp function) disposed therebetween. The second layer is also concatenated to a third layer including an appropriate number of elements (for example, the same number as the number of elements in the input layer) with a non-linear activation function disposed therebetween. In this way, the decoding unit has intermediate layers concatenated in multiple layers similarly to the encoding unit. The final layer of the decoding unit includes the same number of elements as the number of dimensions of the feature amount vector, and the output value of the elements is called the decoding vector.

The learning unit 15 updates the parameters of the neural networks of the encoding unit 12 and the decoding unit 13 so as to minimize a loss function defined by a function of the feature amount vector D1, the encoding vector D2, and the decoding vector D3. As the evaluation function, the sum of the magnitude of the error between the feature amount vector D1 and the decoding vector D3, and the value obtained by multiplying the dissimilarity between the distribution of the encoding vector D2 and a certain distribution by a certain positive constant $\beta$ is used.

As the error between the feature amount vector D1 and the decoding vector D3, for example, a square error, an L1 norm, an Lp norm, or the like may be used. As a distribution for measuring the dissimilarity with the distribution of the encoding vector, for example, an isotropic normal distribution having a standard deviation of 1 with vector 0 as the average or a Laplace distribution having a standard deviation of 1 with vector 0 as the average may be used. As the dissimilarity of the distribution, a value obtained by multiplying the Kullback-Leibler (KL) divergence by −1 may be used.

The loss function can be minimized by a known optimization algorithm such as, for example, SGD, Momentum SGD, AdaGrad, RMSprop, AdaDelta, and Adam.

According to the present embodiment configured as described above, since the device model vector D4 is input to both the encoding unit 12 and the decoding unit 13, even if the information of the device model vector D4 does not remain in the encoding vector D2, the decoding vector D3 can be predicted accurately. Therefore, as the learning unit 15 repeats a learning process, the compression efficiency of the encoding vector D2 gradually improves, and the information of the device model vector D4 disappears from the encoding vector D2. As a result, the parameters of the encoding unit 12 and the parameters of the decoding unit 13 are learned so that the encoding vector D2 has a common distribution regardless of the model of the device 3. In the present embodiment, the encoding vector D2 has a common distribution regardless of the model of the device 3. Therefore, since mapping in the neural network is shared as much as possible in order to express the features of sound common between the device models, the size of a parameter space that needs to be searched in the learning process can be reduced. As a result, according to the present embodiment, the optimization of the learning process is facilitated.

Second Embodiment

A second embodiment will be described with reference to FIGS. 10 to 14. In each of the following embodiments including the present embodiment, the differences from the first embodiment will be mainly described.

Figure 10:
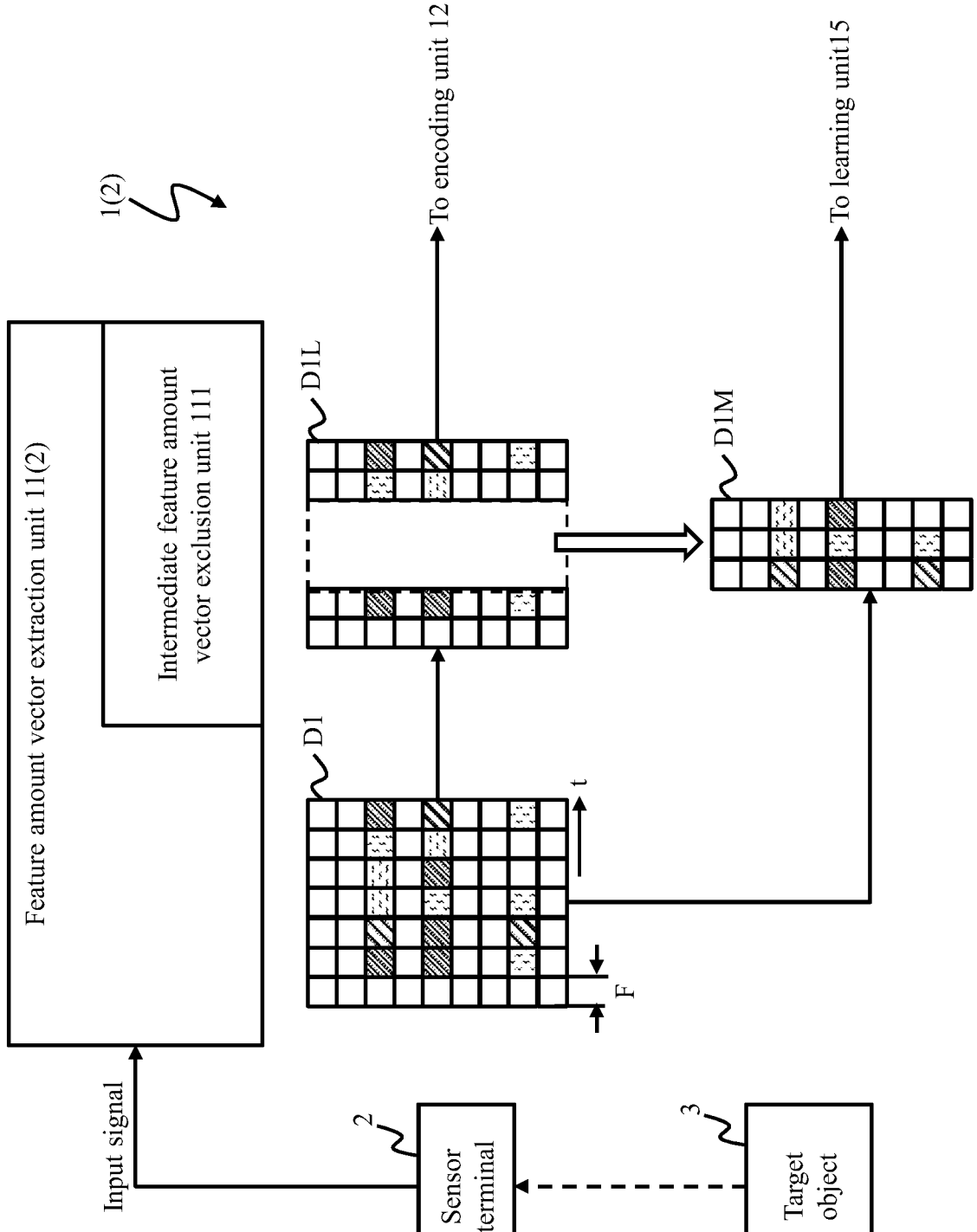
FIG. 10 is an explanatory diagram illustrating a feature amount vector generation method according to a second embodiment.
Figure 11:
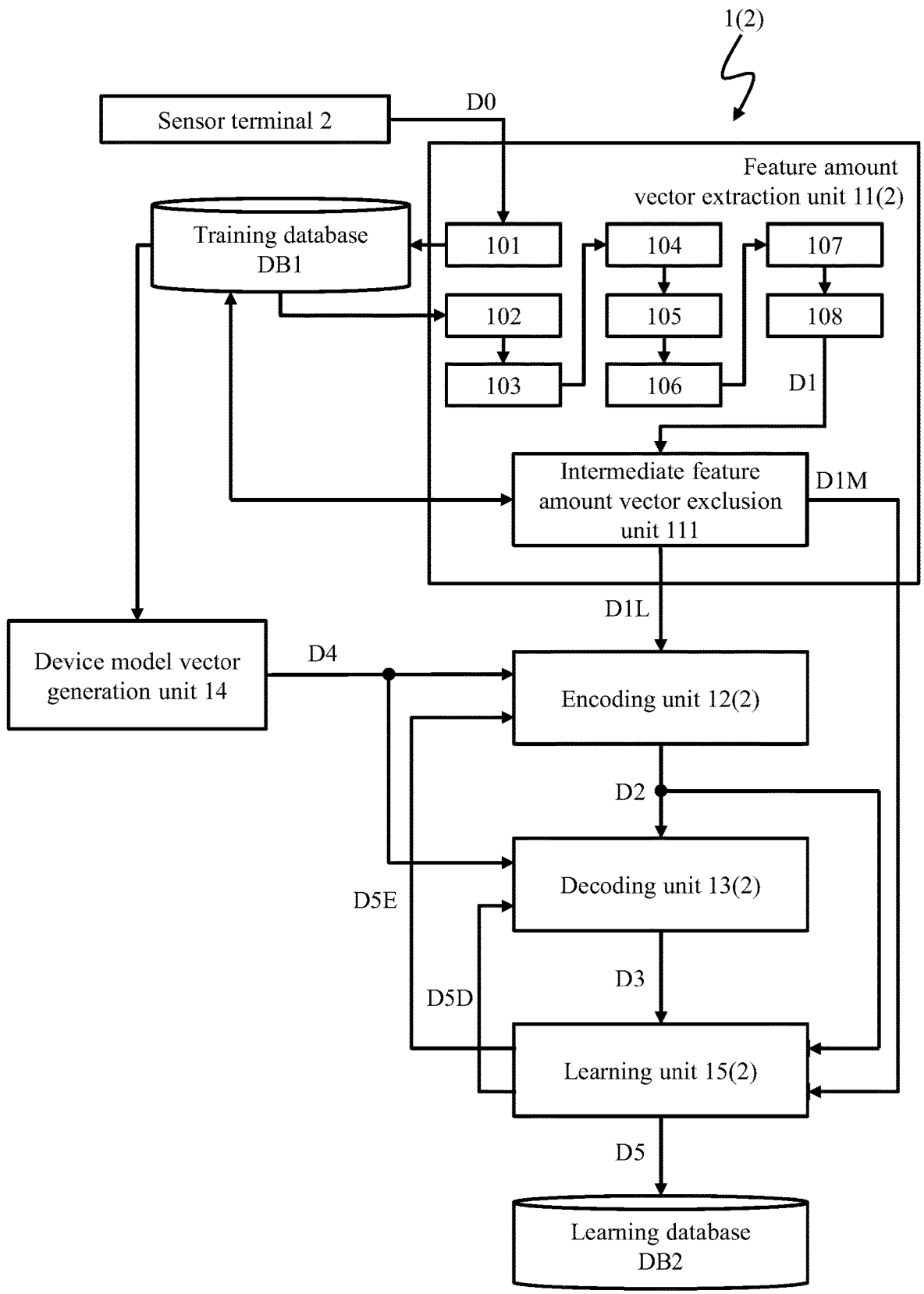
FIG. 11 is a block configuration diagram of a learning subsystem.
Figure 12:
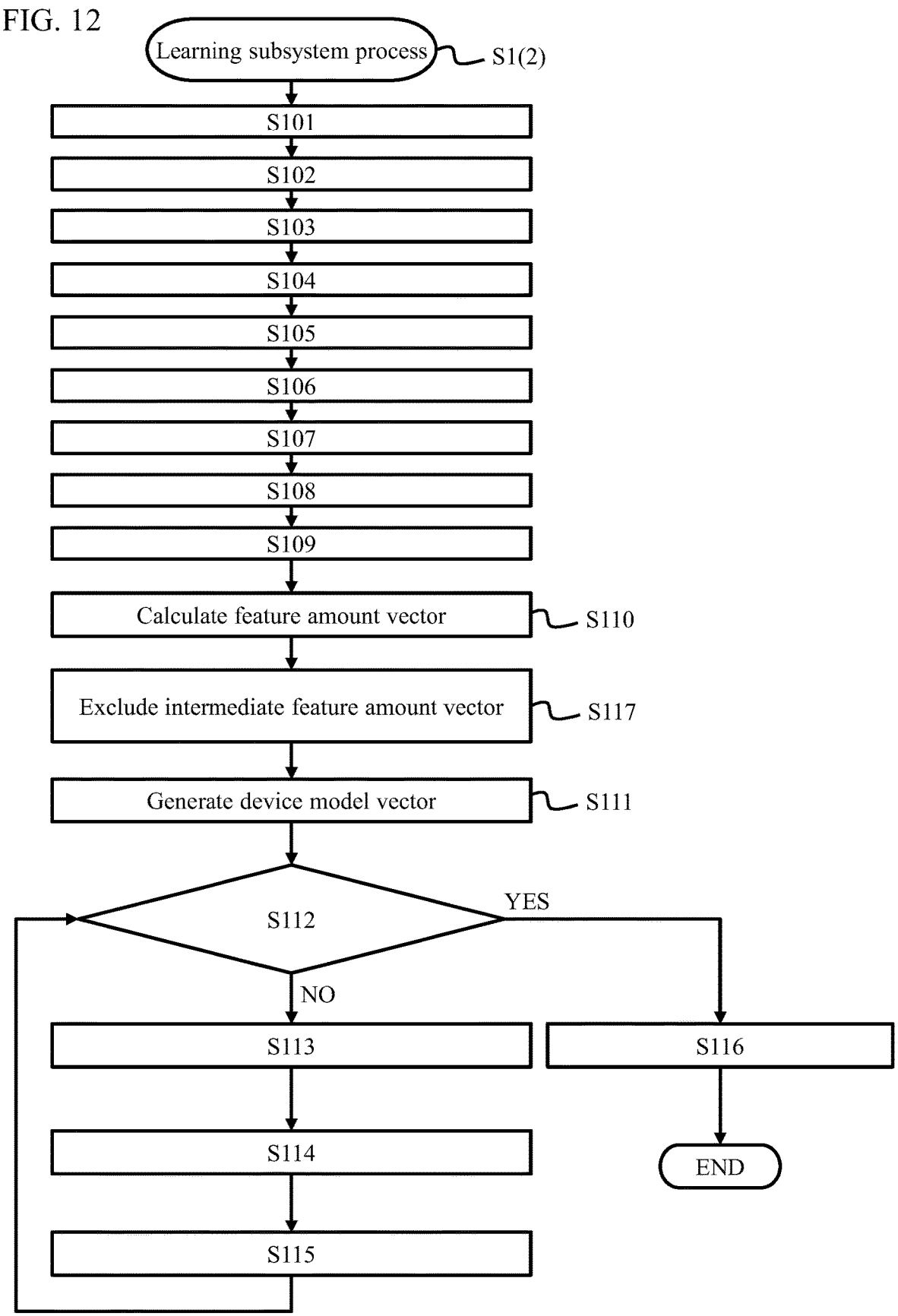
FIG. 12 is a processing flow of the learning subsystem.
Figure 13:
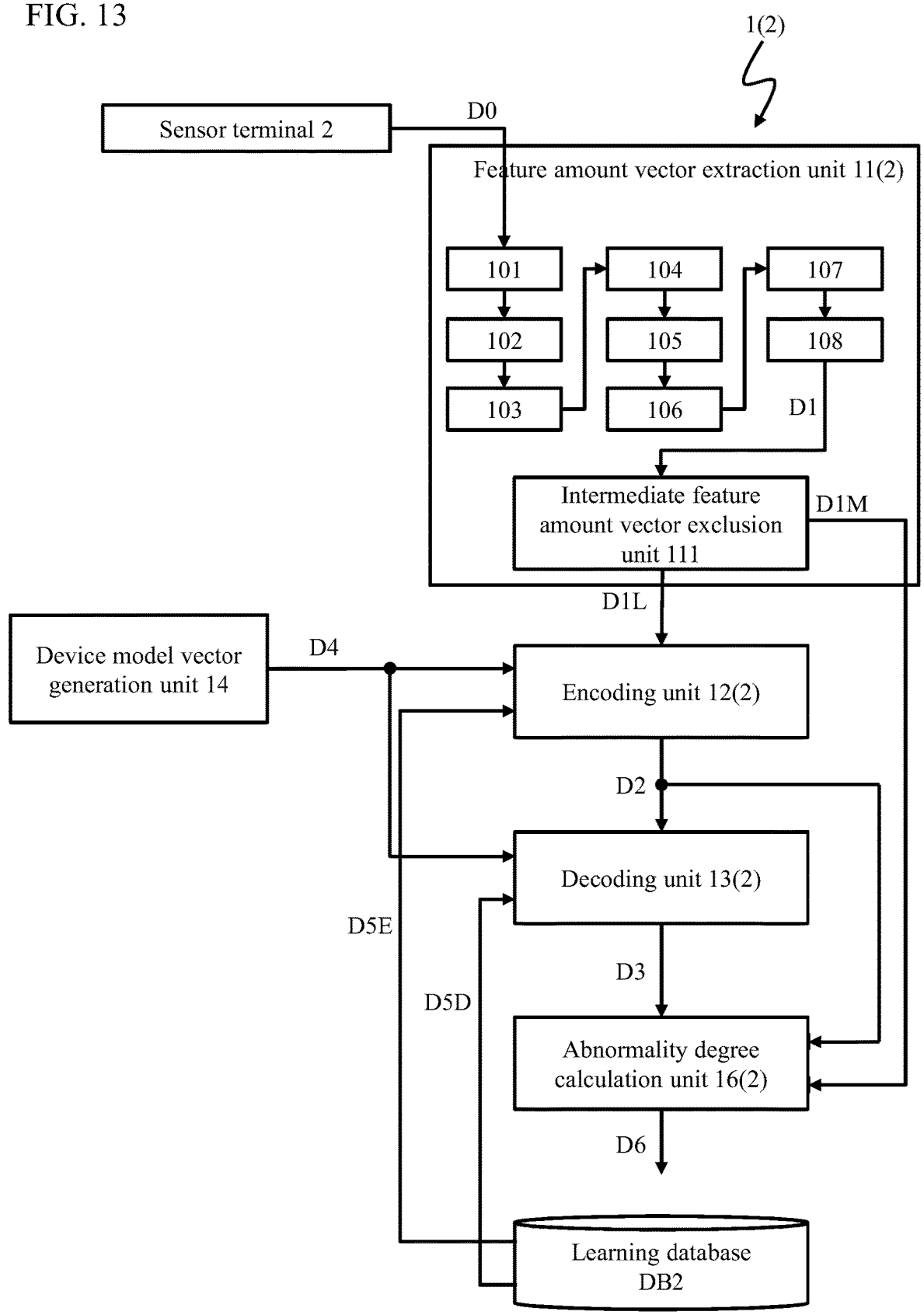
FIG. 13 is a block configuration diagram of an abnormality degree calculation subsystem.
Figure 14:
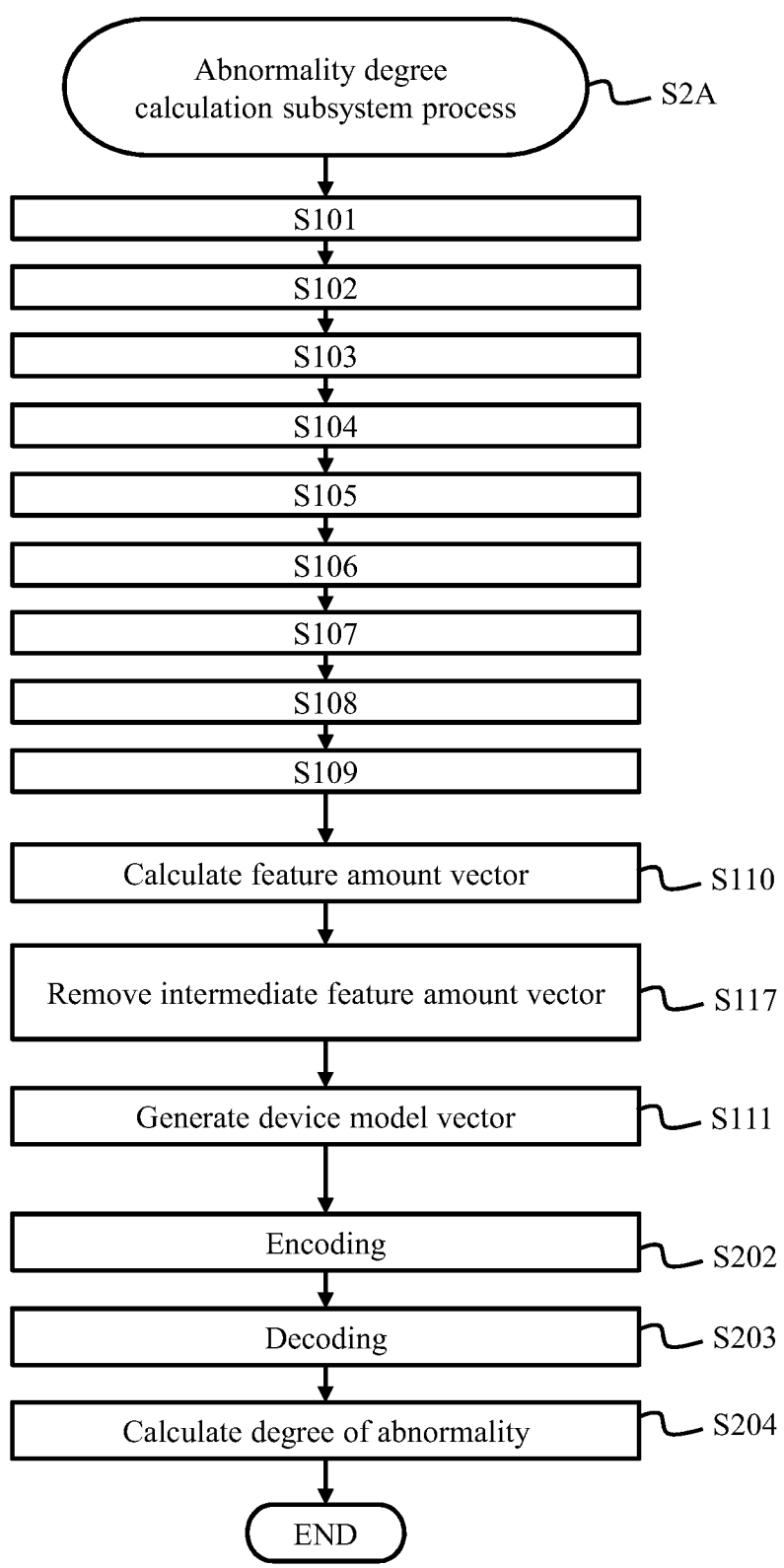
FIG. 14 is a processing flow of the abnormality degree calculation subsystem.

FIG. 10 is an explanatory diagram illustrating a method of generating a feature amount vector. FIG. 11 is a block configuration diagram of the learning subsystem LSS. FIG. 12 is a processing flow of the learning subsystem LSS. FIG. 13 is a block configuration diagram of the abnormality degree calculation subsystem DSS. FIG. 14 is a processing flow of the abnormality degree calculation subsystem DSS.

A feature amount vector extraction unit 11(2) of an abnormality degree calculation system 1(2) of the present embodiment includes an intermediate feature amount vector exclusion unit 111 that calculates a feature amount vector D1L (hereinafter, a post-loss feature amount vector D1L) obtained by removing a plurality of frames D1M (hereinafter, an intermediate feature amount vector D1M) in a predetermined region (for example, an intermediate time point) from the feature amount vector D1 calculated by the feature amount time-series calculation unit 108.

The predetermined region may be a region of a predetermined time before and after the center on the time axis of the feature amount vector D1 of the input signal D0, a predetermined proportion of region before and after the center of the total time length of the feature quantity vector D1 of the input signal D0, or a region containing either the signal immediately before the state changes or the signal immediately after the state changes when the state of the target device 3 changes.

The following discloses a variational interpolation deep neural network (VIDNN)-type configuration. The intermediate feature amount vector exclusion unit 111 removes the intermediate feature amount vector D1M, which is a plurality of frames at the intermediate time pint of the input feature amount time-series D1, and outputs the post-loss feature amount vector D1L (step S117 in FIG. 12).

Here, as the intermediate feature amount vector D1M, K adjacent frames that are exactly in the center of the feature amount time-series may be selected, or K adjacent frames that are shifted back and forth from the center may be selected. Further, K frames may be regarded as one cluster, and two or more C clusters may be deleted. In that case, CK frames among L frames are deleted and the (L-CK) frames remain as the input feature amount. In any case, by allowing the preceding and subsequent frames to remain as the input feature amount D1L, it is possible to predict the intermediate feature amount vector D1M even if the normal sound feature amount vector D1 changes suddenly over time.

Even if K=1, abnormality detection works well. However, when K=1, there is a high possibility that the intermediate feature amount vector D1M can be interpolated with high accuracy using only the information of the preceding and subsequent frames regardless of whether the device 3 is normal or abnormal. In contrast, when K is set to 2 or more, it is difficult to predict the intermediate feature amount vector D1M only from the preceding and subsequent frames as compared to the case of K=1. Therefore, the predicted value of the intermediate feature amount vector D1M strongly depends on the learned distribution of the feature amount in the normal state. Therefore, if the device 3 is normal, both the predicted value and the true value of the intermediate feature amount vector D1M follow the learned distribution of the feature amount in the normal state. Therefore, the error between the predicted value and the true value becomes small. In contrast, if the device 3 is abnormal, the predicted value of the intermediate feature amount vector D1M follows the learned distribution of the feature amount in the normal state, but the true value of the intermediate feature amount vector D1M does not follow the distribution of the feature amount in the normal state. Therefore, the error between the predicted value and the true value becomes large. Therefore, the accuracy of abnormality detection when K is 2 or more is higher than when K=1. Therefore, it is desirable to set K to 2 or more.

The encoding unit 12(2) of the present embodiment illustrated in FIG. 11 is a multi-layer neural network, and the input layer thereof includes a number of elements corresponding to the sum of the number of dimensions of the post-loss feature amount vector D1L and the number of dimensions of the device model vector D4, and the elements receive the elements of a vector obtained by concatenating the post-loss feature amount vector D1L and the device model vector D4.

The input layer is concatenated to a second layer including an appropriate number of elements (for example, the same number as the number of elements in the input layer) with a non-linear activation function (for example, a ramp function) disposed therebetween. The second layer is also concatenated to a third layer including an appropriate number of elements (for example, the same number as the number of elements in the input layer) with a non-linear activation function disposed therebetween. The second and subsequent layers that are concatenated in multiple layers in this way are called intermediate layers. The end of the intermediate layers of the encoding unit includes 2Q elements, which is twice the number of dimensions Q of the encoding vector. These elements are divided in half into Q, and the output values of the elements are defined as $\mu\_1$, $\mu\_2, \ldots, \mu\_Q, \sigma\_1, \sigma\_2, \ldots,$ and $\sigma\_Q$.

Here, a column vector having $\mu\_1, \mu\_2, \ldots, M\_Q$ in each element is defined as $\mu$, and a diagonal matrix having $\sigma\_1, \sigma\_2, \ldots, \sigma\_Q$ in each element of diagonal components is defined as $\Sigma$. The final layer of the encoding unit probabilistically generates an encoding vector z having the number of dimensions Q according to a multidimensional normal distribution $N(z; \mu, \Sigma)$ with $\mu$ as the average and $\Sigma$ as the covariance matrix.

The decoding unit 13 of the present embodiment is a multi-layer neural network, and the input layer thereof includes a number of elements corresponding to the sum of the number of dimensions Q of the encoding vector D2 and the number of dimensions of the device model vector D4, and these elements receive the elements of a vector obtained by concatenating the encoding vector D2 and the device model vector D4. The input layer is concatenated to a second layer including an appropriate number of elements (for example, the same number as the number of elements in the input layer) with a non-linear activation function (for example, a ramp function) disposed therebetween. The second layer is also concatenated to a third layer including an appropriate number of elements (for example, the same number as the number of elements in the input layer) with a non-linear activation function disposed therebetween. In this way, the decoding unit 13(2) has intermediate layers concatenated in multiple layers similarly to the encoding unit 12(2). The final layer of the decoding unit 13(2) includes the same number of elements as the number of dimensions of the intermediate feature amount vector D1M, and the output value of the elements is called the decoding vector D3.

The learning unit 15(2) of the present embodiment updates the parameters of the neural networks of the encoding unit 12(2) and the decoding unit 13(2) so as to minimize a loss function defined by a function of the intermediate feature amount vector D1M, the encoding vector D2, and the decoding vector D3.

As the evaluation function, the sum of the magnitude of the error between the intermediate feature amount vector D1M and the decoding vector D3, and the value obtained by multiplying the dissimilarity between the distribution of the encoding vector D2 and a certain distribution by a certain positive constant β is used.

As the error between the intermediate feature amount vector D1M and the decoding vector D3, for example, a square error, an L1 norm, an Lp norm, or the like may be used. As a distribution for measuring the dissimilarity with the distribution of the encoding vector, for example, an isotropic normal distribution having a standard deviation of 1 with vector 0 as the average or a Laplace distribution having a standard deviation of 1 with vector 0 as the average may be used. As the dissimilarity of the distribution, a value obtained by multiplying the Kullback-Leibler (KL) divergence by −1 may be used.

The loss function can be minimized by a known optimization algorithm such as, for example, SGD, Momentum SGD, AdaGrad, RMSprop, AdaDelta, and Adam.

In the processing flow of the learning subsystem LSS of FIG. 12, after the feature amount vector extraction unit 11(2) calculates the feature amount vector D1 (S110), the intermediate feature amount vector exclusion unit 111 removes the intermediate feature amount vector D1M to generate the post-loss feature amount vector D1L, and outputs the post-loss feature amount vector D1L and the intermediate feature amount vector D1M (S117).

In the block configuration and the processing flow of the abnormality degree calculation subsystem DSS illustrated in FIGS. 13 and 14, the encoding vectors D2 (S202) output from the encoding unit 12(2), the decoding vectors D3 (S203) output from the decoding unit 13(2), and the intermediate feature amount vector D1M (S117) output from the intermediate feature amount vector exclusion unit 111 are input to the abnormality degree calculation unit 6(2). Then, the abnormality degree calculation unit 6(2) calculates the degree of abnormality on the basis of these inputs.

The present embodiment configured in this way also has the same effect as that of the first embodiment. Further, in the present embodiment, the intermediate feature amount vector (intermediate feature amount time-series) D1M is removed from the feature amount vector (feature amount time-series) D1 to generate the post-loss feature amount vector (post-loss feature amount time-series) D1L, and the removed intermediate feature amount time-series (intermediate feature amount vector) D1M is interpolated. Therefore, according to the present embodiment, it is possible to calculate the degree of abnormality with high accuracy for a plurality of device models with a small number of pieces of necessary learning data per device model in a device 3 in which the sound changes greatly over time.

Third Embodiment

A third embodiment will be described with reference to FIGS. 15 to 21. In the present embodiment, the device category vector D7 is used in addition to the device model vector D4.

Figure 15:
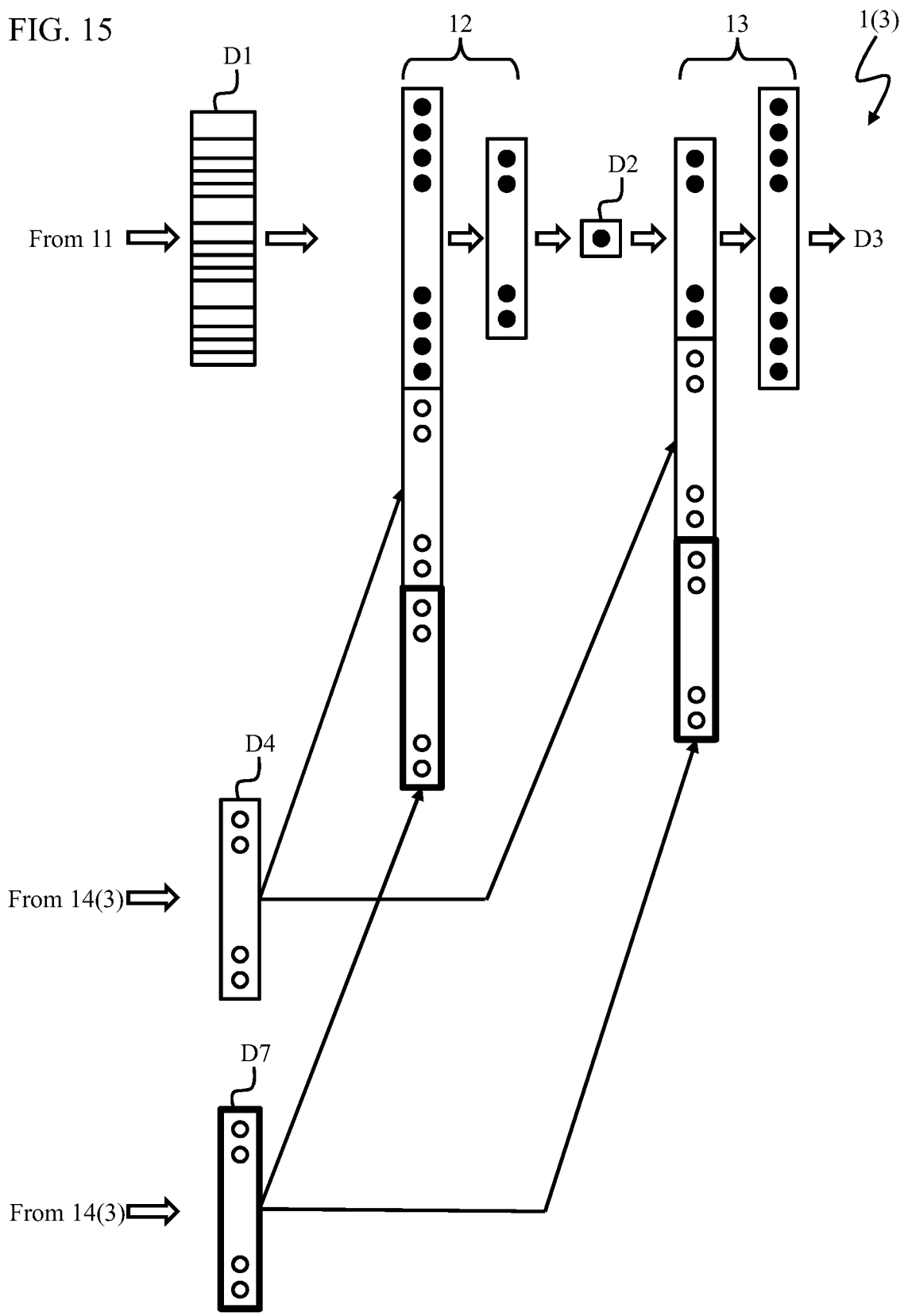
FIG. 15 is an explanatory diagram illustrating the relationship between a feature amount vector, an encoding vector, a decoding vector, and the like according to a third embodiment.

FIG. 15 is an explanatory diagram illustrating the relationship between the feature amount vector D1, the device model vector D4, the device category vector D7, the encoding vector D2, and the decoding vector D3.

In the abnormality degree calculation system 1(3) according to the present embodiment, the encoding unit 12 receives an One-Hot vector (the device category vector) D7 representing a device category which is a superordinate concept of the device model as well as the feature amount vector D1 of sound and the device model vector D4.

The decoding unit 13 receives the device category vector D7 as well as the encoding vector D2 and the device model vector D4.

Figure 16:
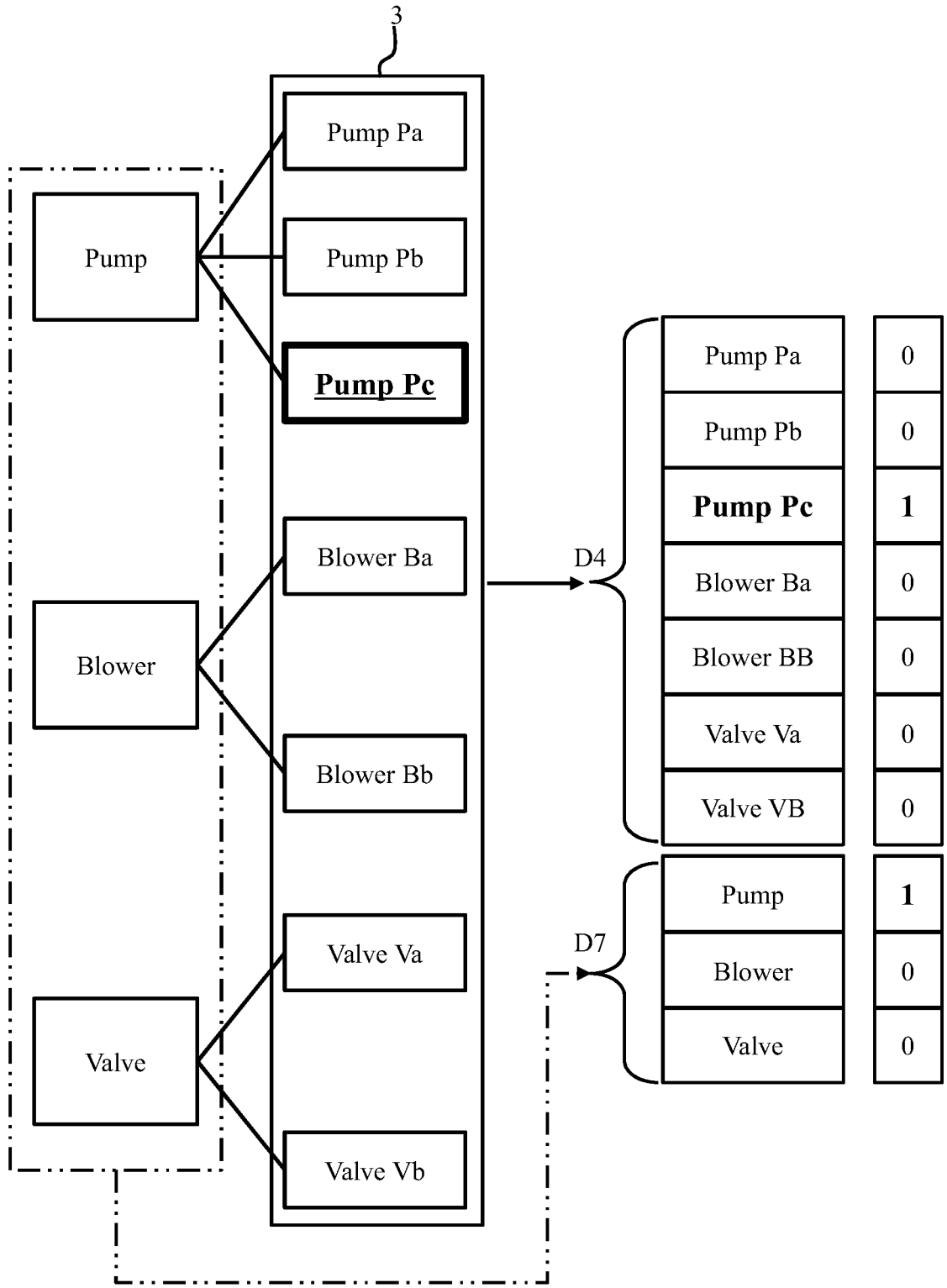
FIG. 16 is an explanatory diagram illustrating the relationship between a device model vector and a device category vector.

FIG. 16 is an explanatory diagram illustrating the relationship between the device model vector D4 and the device category vector D7. It is assumed that there are, for example, a pump Pa, a pump Pb, a pump Pc, a blower Ba, a blower Bb, a valve Va, and a valve Vb as the type of the device 3 that can be the target of the abnormality degree calculation system 1(3).

The pump Pa, the pump Pb, and the pump Pc are devices belonging to the category "pump". Similarly, the blower Ba and the blower Bb belong to the category "blower", and the valve Va and the valve Vb belong to the category "valve".

Figure 17:
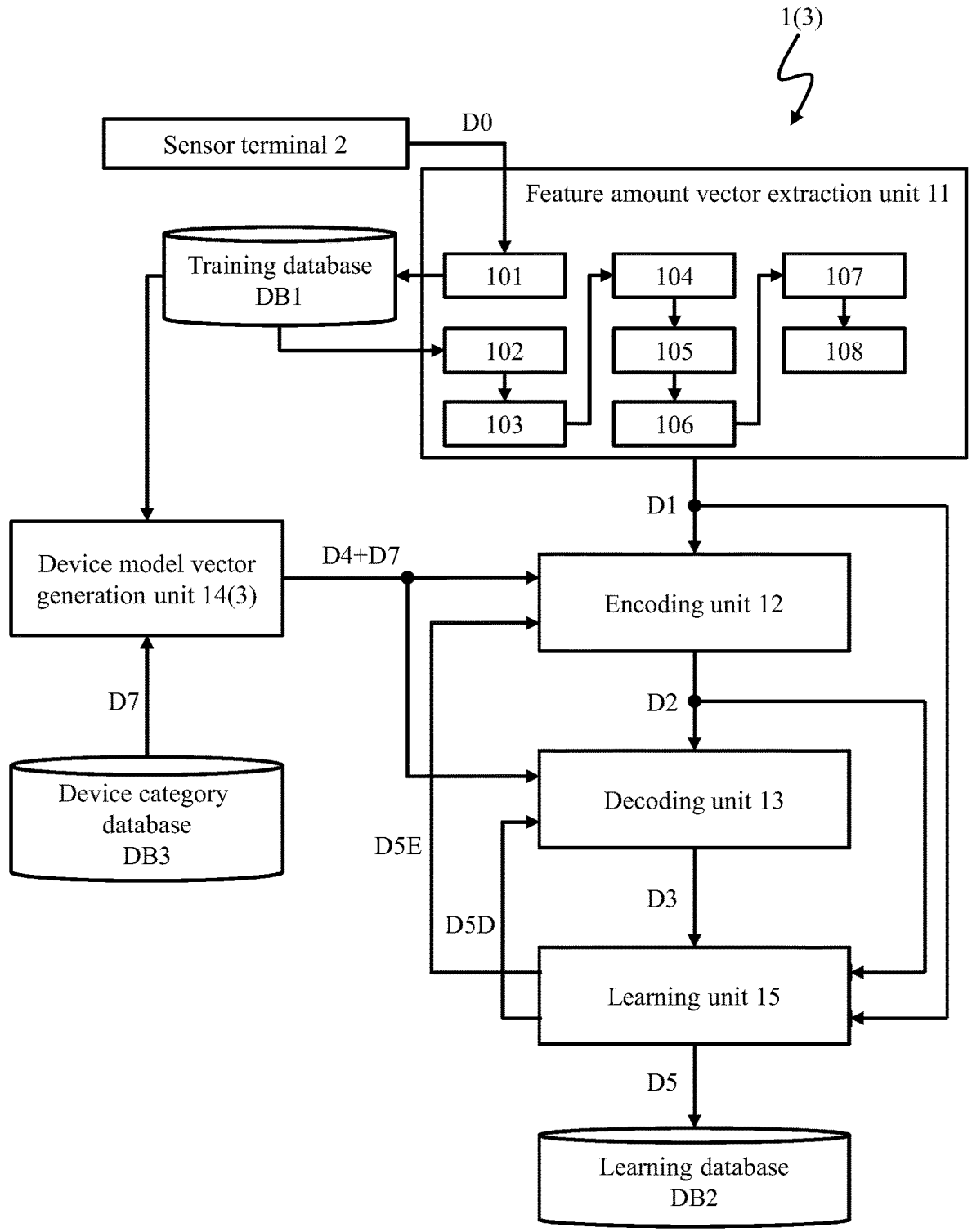
FIG. 17 is a block configuration diagram of a learning subsystem.
Figure 18:
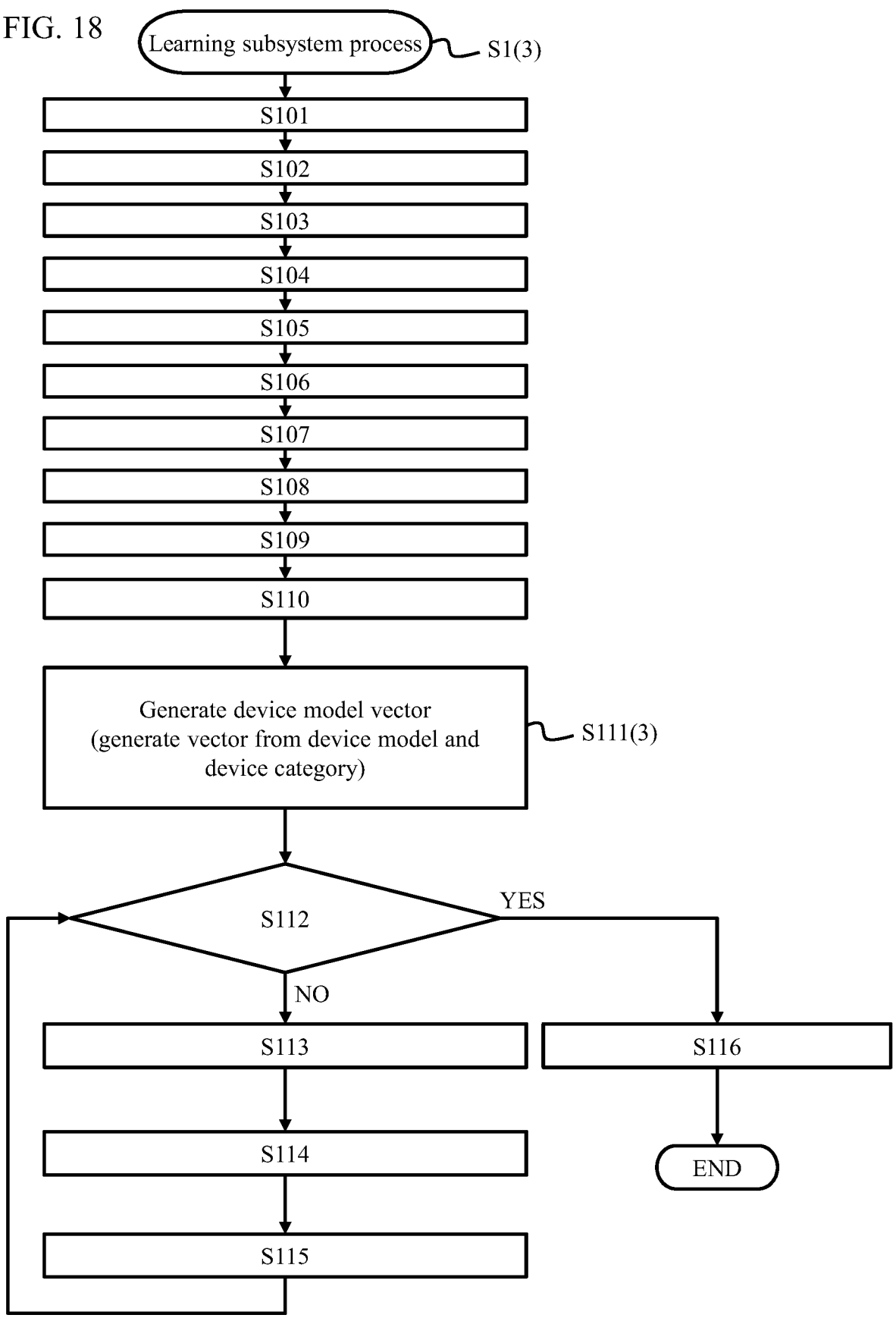
FIG. 18 is a processing flow of the learning subsystem.

FIG. 17 is a block configuration diagram of the learning subsystem LSS. FIG. 18 is a processing flow of the learning subsystem LSS.

The device category vector D7 is read from the device category database DB3 by the device model vector generation unit 14(3) and is concatenated to the device model vector D4 (D4+D7). Then, the device model vector D4 and the device category vector D7 are input to the encoding unit 12 and the decoding unit 13 (S111(3)).

Figure 19:
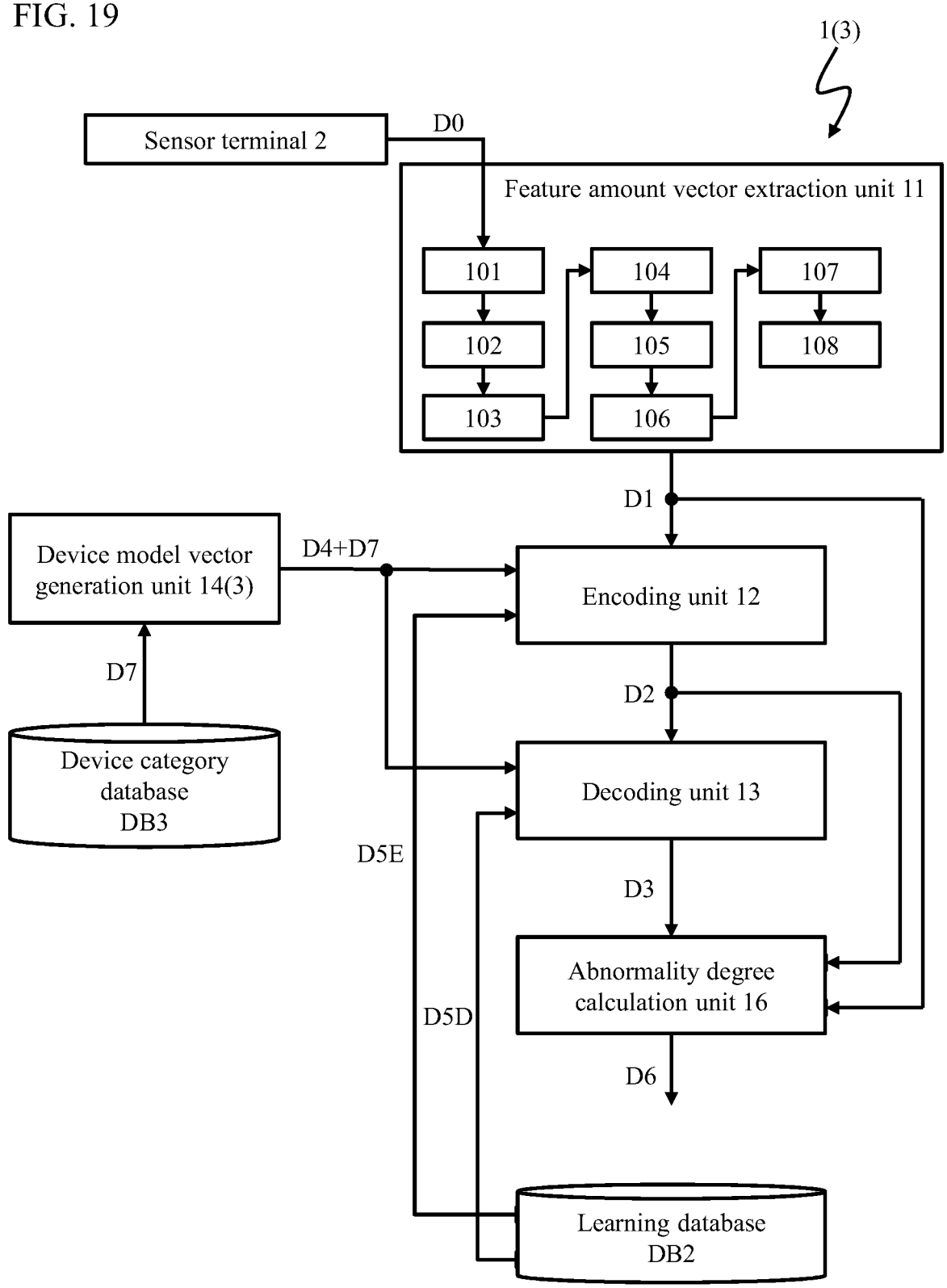
FIG. 19 is a block configuration diagram of an abnormality degree calculation subsystem.
Figure 20:
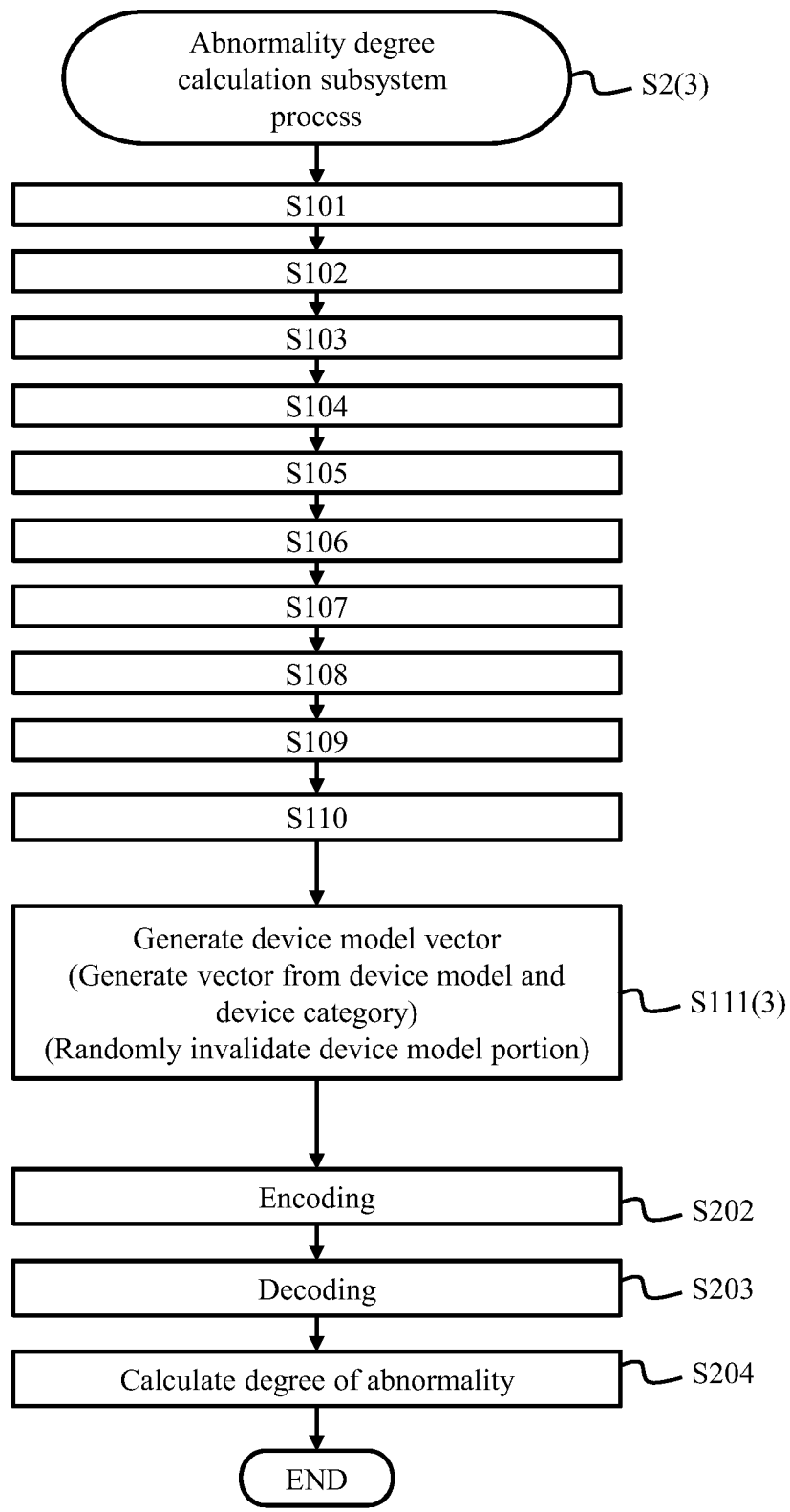
FIG. 20 is a processing flow of the abnormality degree calculation subsystem.

FIG. 19 is a block configuration diagram of the abnormality degree calculation subsystem DSS. FIG. 20 is a processing flow of the abnormality degree calculation subsystem DSS.

As described in the learning subsystem LSS, the device category vector D7 is concatenated to the device model vector D4 (D4+D7) and input from the device model vector generation unit 14(3) to the encoding unit 12 and the decoding unit 13 (S111(3)).

The present embodiment configured in this way also has the same effect as that of the first embodiment. Further, in the present embodiment, since the device category vector D7 as well as the device model vector D4 are used, the mapping of neural networks is shared as much as possible even if the device model is different in a device group having the same device category. As a result, according to the present embodiment, the size of the parameter space that needs to be searched becomes small, learning can be easily optimized, and abnormalities can be detected with high accuracy.

Further, according to the present embodiment, the necessary learning data per device model is reduced. For example, even if the amount of the data of "pump Pc" is small, the features common to the "pump" are learned on the basis of the learning data of other device models belonging to the same category "pump".

Figure 21:
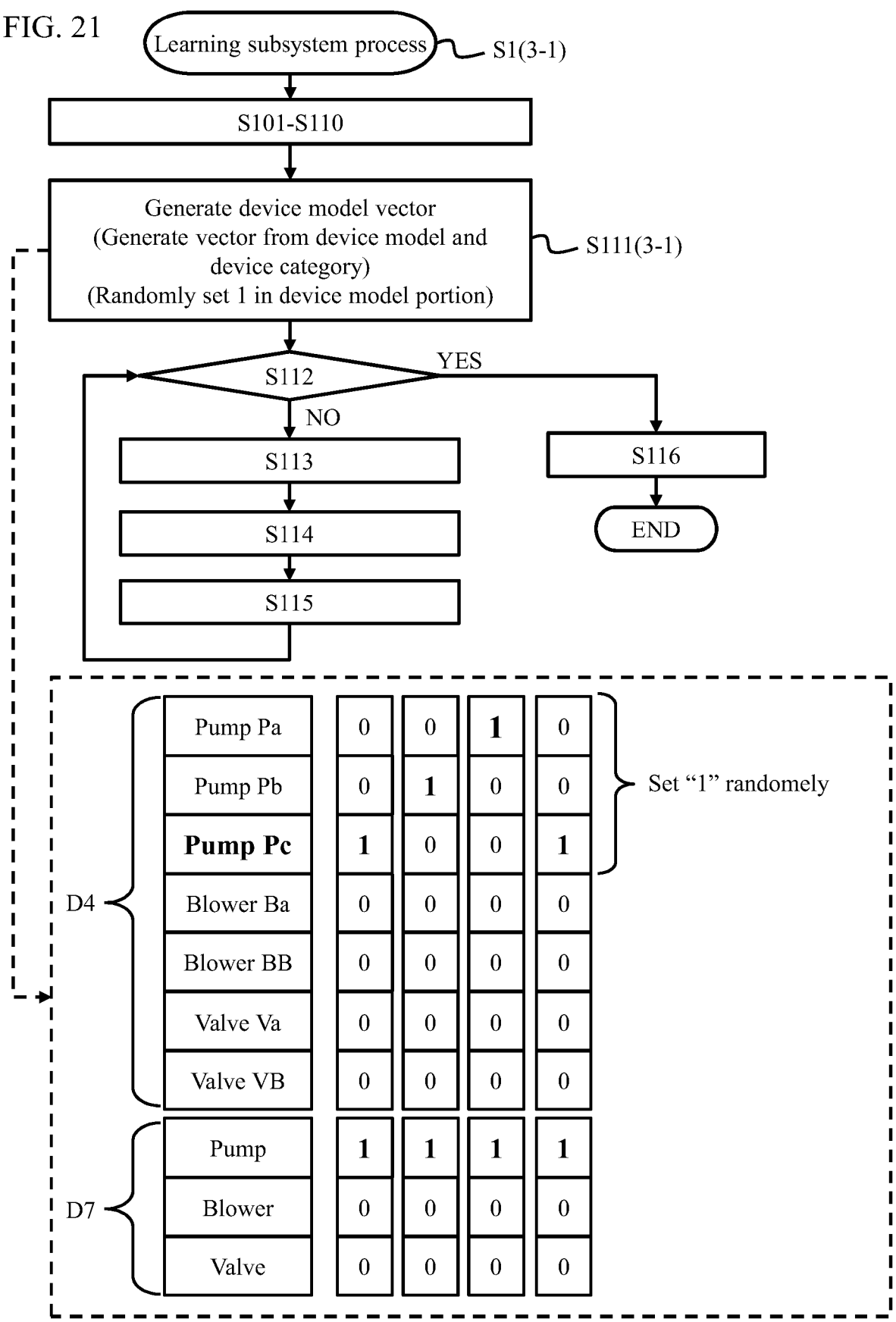
FIG. 21 is an explanatory diagram of a modification that further enhances the accuracy of the learning subsystem.

FIG. 21 is an explanatory diagram illustrating a modification of the learning subsystem LSS. In this modification, when the learning unit 15 updates the parameters of the neural network, the device model vector D4 is probabilistically invalidated and input to the encoding unit 12 (S111 (3-1)).

That is, during the iterative process of updating the neural network parameters, the device model vector D4 is input to the encoding unit 12 in such a way that the element "0" is replaced with "1" with a certain probability, and the element "1" is replaced with "0" with another certain probability.

For example, as illustrated in the lower part of FIG. 19, "1" is set to only the "pump" category in the device category vector D7, and each element belonging to the "pump" category is randomly selected in the device model vector D4 belonging to the "pump" category.

In this modification, since only the device model vector D4 is probabilistically invalidated from time to time, the neural network parameters are learned so that the mappings for a plurality of device models included in the same device category are similar.

Therefore, in this modification, since the size of the parameter space that needs to be searched becomes small, the optimization of learning is facilitated and the abnormalities are detected with high accuracy. In addition, the necessary learning data for each model is reduced.

Fourth Embodiment

Figure 22:
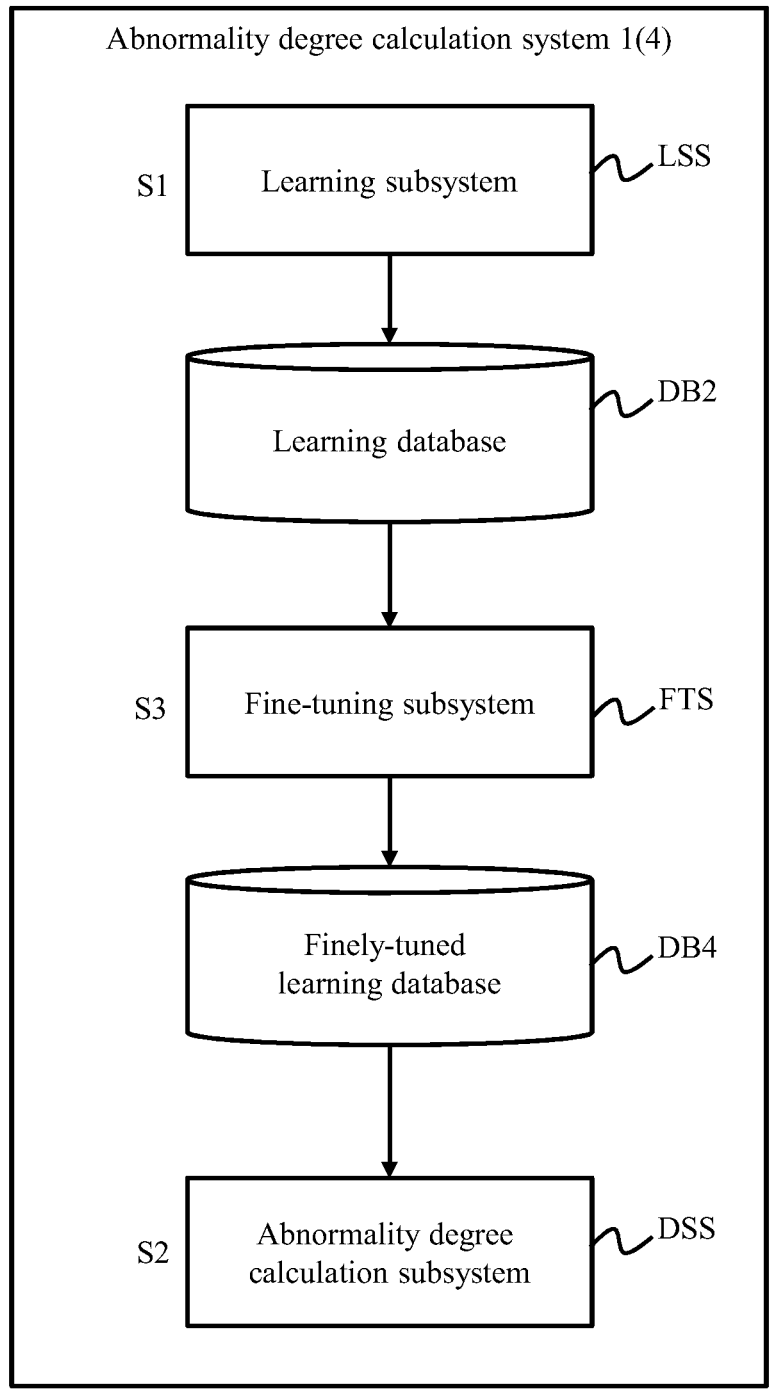
FIG. 22 is a block configuration diagram of an abnormality degree calculation system according to a fourth embodiment.

A fourth embodiment will be described with reference to FIGS. 22 to 24. The present embodiment also deals with an unknown device model that may be added as a management target in the future. FIG. is a block configuration diagram of the abnormality degree calculation system 1(4) according to the present embodiment.

In the abnormality degree calculation system 1(4), a fine-tuning subsystem FTS is provided between the learning subsystem LSS and the abnormality degree calculation subsystem DSS. The fine-tuning subsystem FTS receives the parameters of the pre-learned neural network from the learning database DB2, performs fine tuning, and stores the parameters of the finely-tuned neural network in another learning database DB4 (S3).

Figure 23:
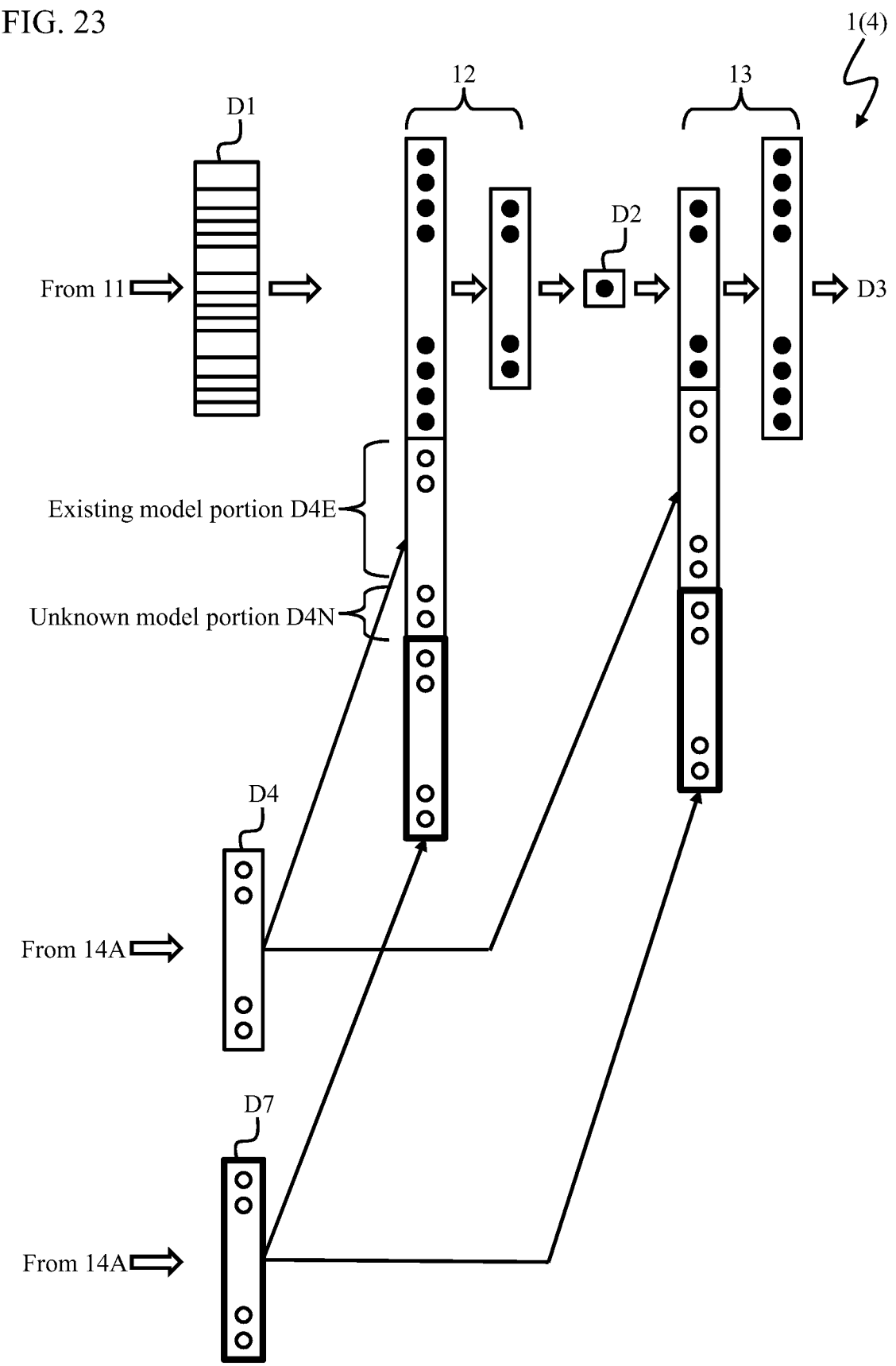
Figure 24:
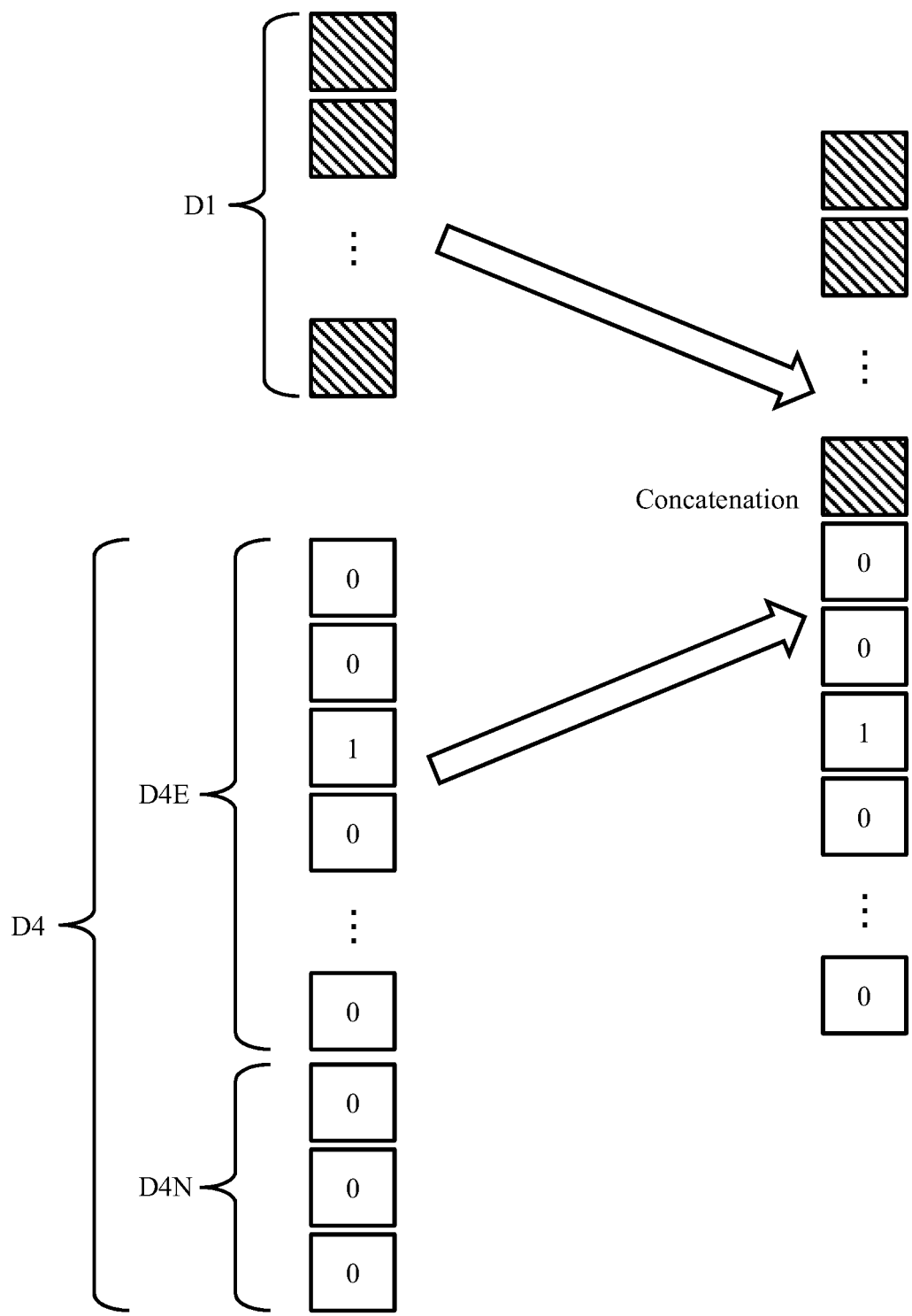
FIG. 24 is an explanatory diagram illustrating a method of creating a vector input to a neural network.

FIG. 23 is an explanatory diagram illustrating the relationship between the feature amount vector D1, the encoding vector D2, the decoding vector D3, the device model vector D4, and the device category vector D7. FIG. 24 illustrates a method of creating a vector input to the encoding unit 12 and the decoding unit 13. In FIG. 24, the device category vector D7 is not illustrated.

In the present embodiment, the device model vector D4 includes an existing model corresponding portion D4E corresponding to an existing device model and an unknown model corresponding portion D4N corresponding to an unknown device model that can be added. When a device of an unknown device model is added as a management inspection target, one element of the unknown model corresponding portion D4N is assigned to the unknown device model.

The present embodiment configured in this way also has the same effect as that of the first embodiment. Further, in the present embodiment, since the device model vector D4 is configured so that the unknown device model can be reserved, the features of an unknown device model can be learned efficiently using the features of an existing device model represented by a learned model even if the learning data for the existing device model cannot be reused.

Further, as will be apparent from the embodiment described later, by preparing the region D4E corresponding to the existing device model and the region D4N corresponding to the unknown device model in the device model vector D4, it is possible to relearn the existing device model later.

Fifth Embodiment

A fifth embodiment will be described with reference to FIGS. 25 to 29. The present embodiment provides an abnormality degree calculation system 1(5) which further improves the fourth embodiment. In the present embodiment, additional learning about an unknown device model is performed by Generative replay.

Figure 25:
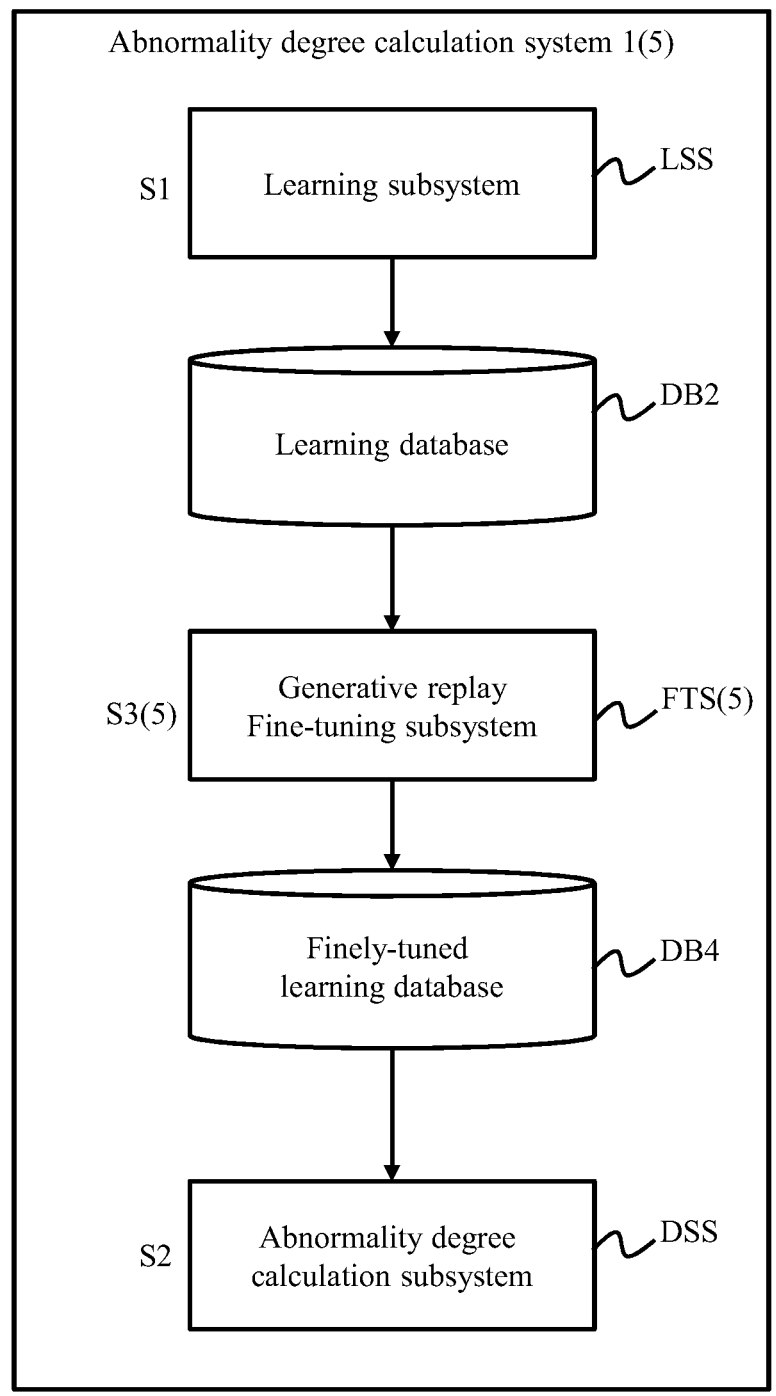
FIG. 25 is a block configuration diagram of an abnormality degree calculation system according to a fifth embodiment.
Figure 26:
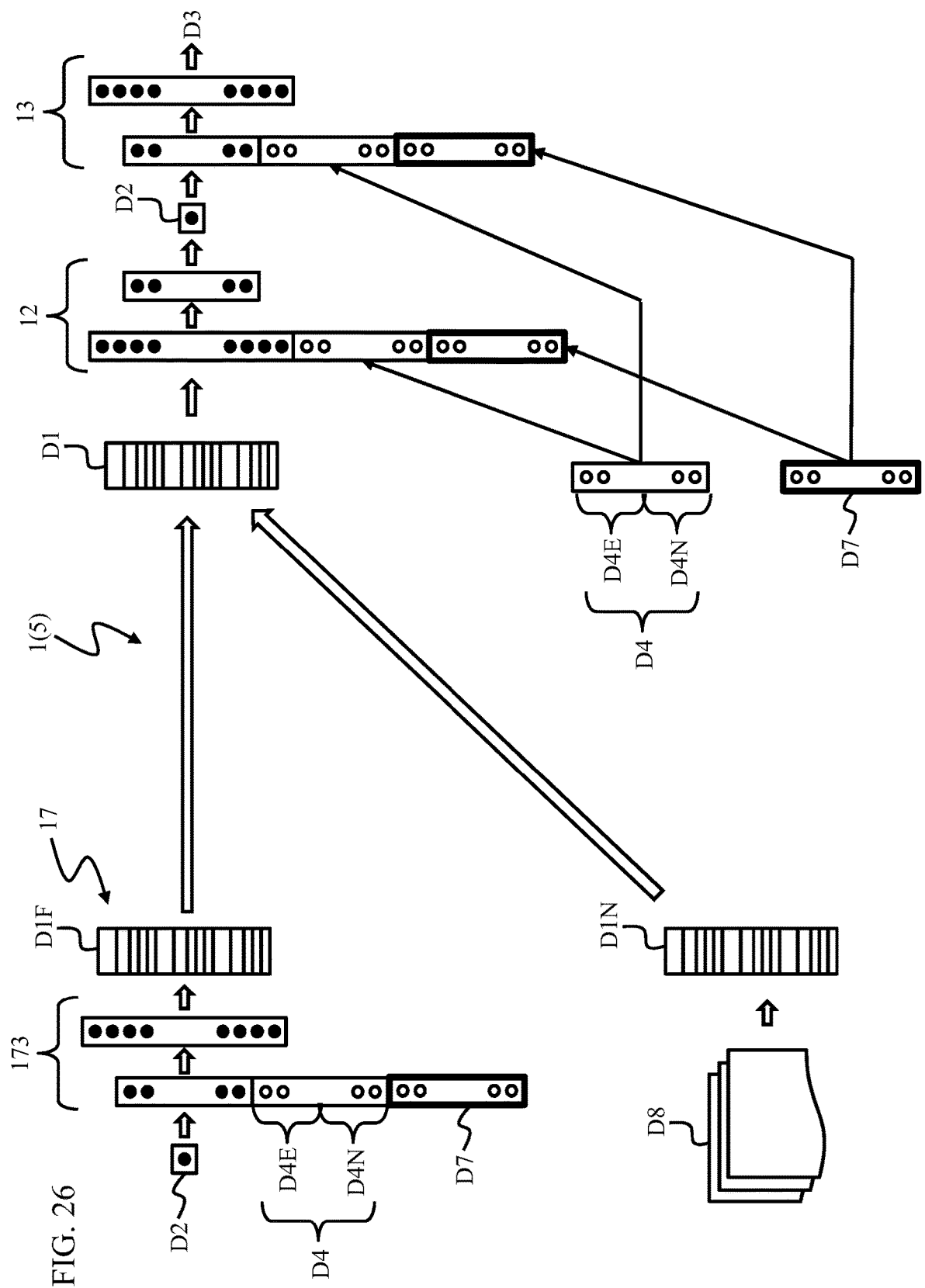
Figure 27:
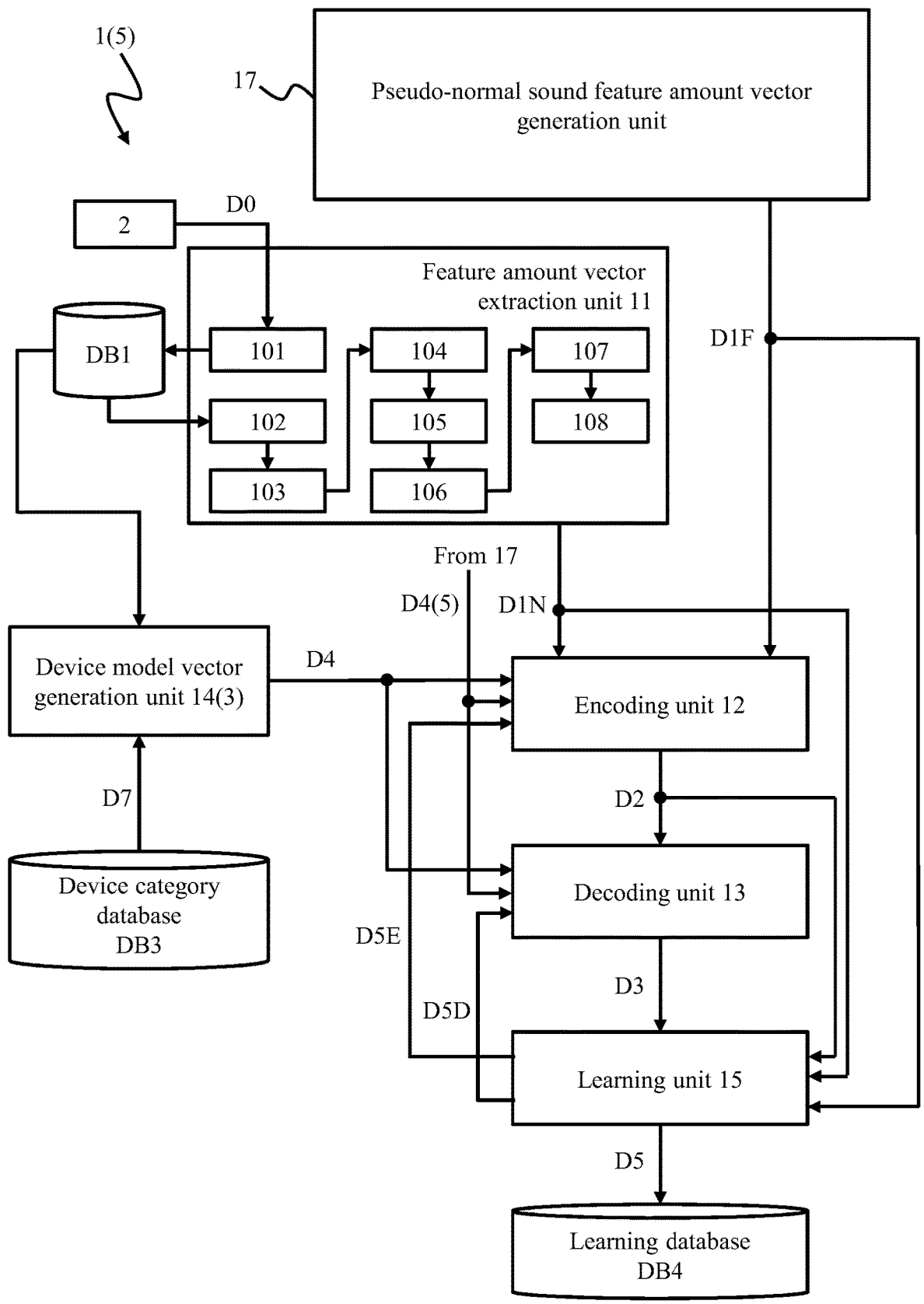
FIG. 27 is a block configuration diagram of a learning subsystem.
Figure 28:
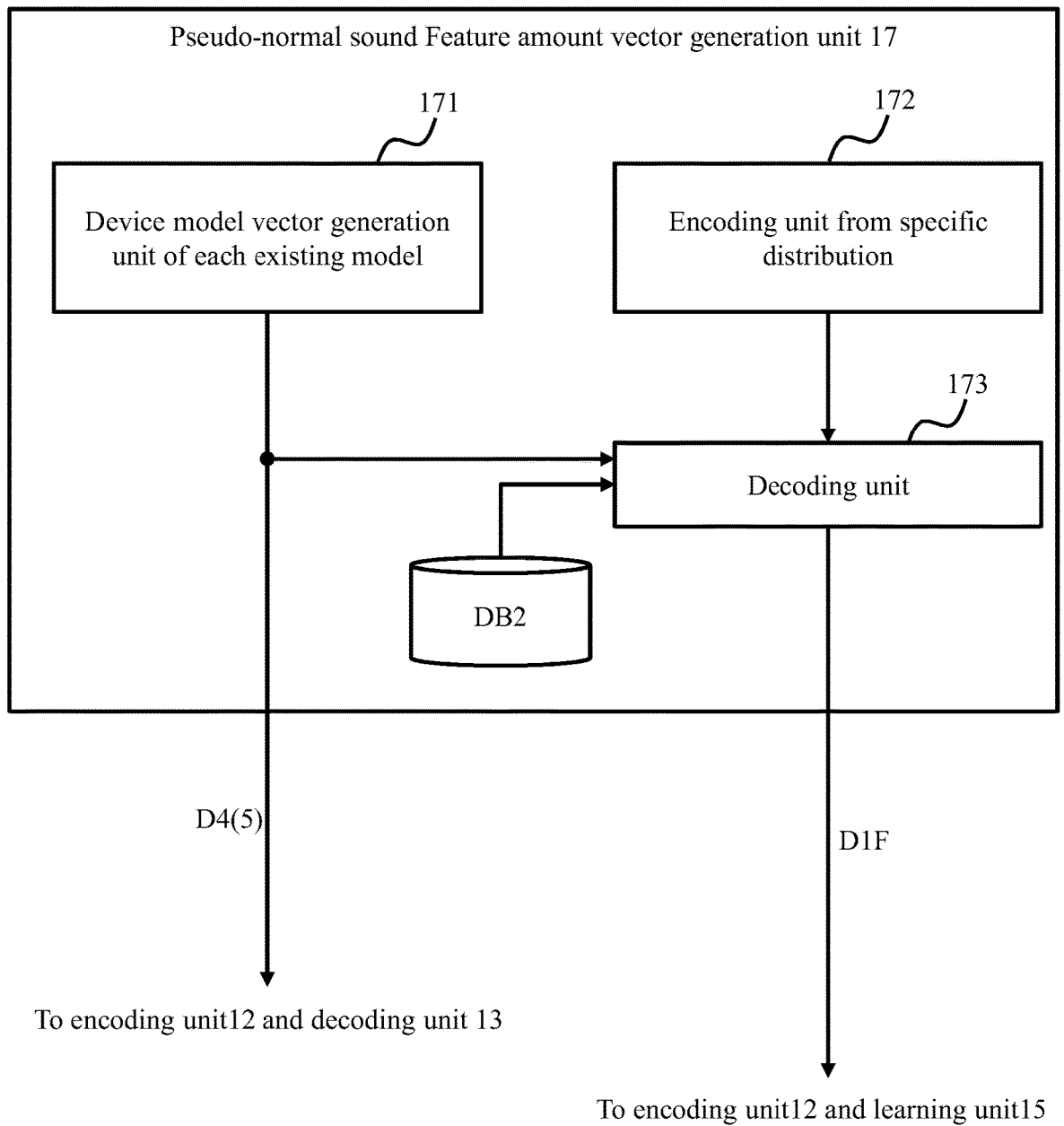
FIG. 28 is a block diagram illustrating details of the functions in FIG. 27.
Figure 29:
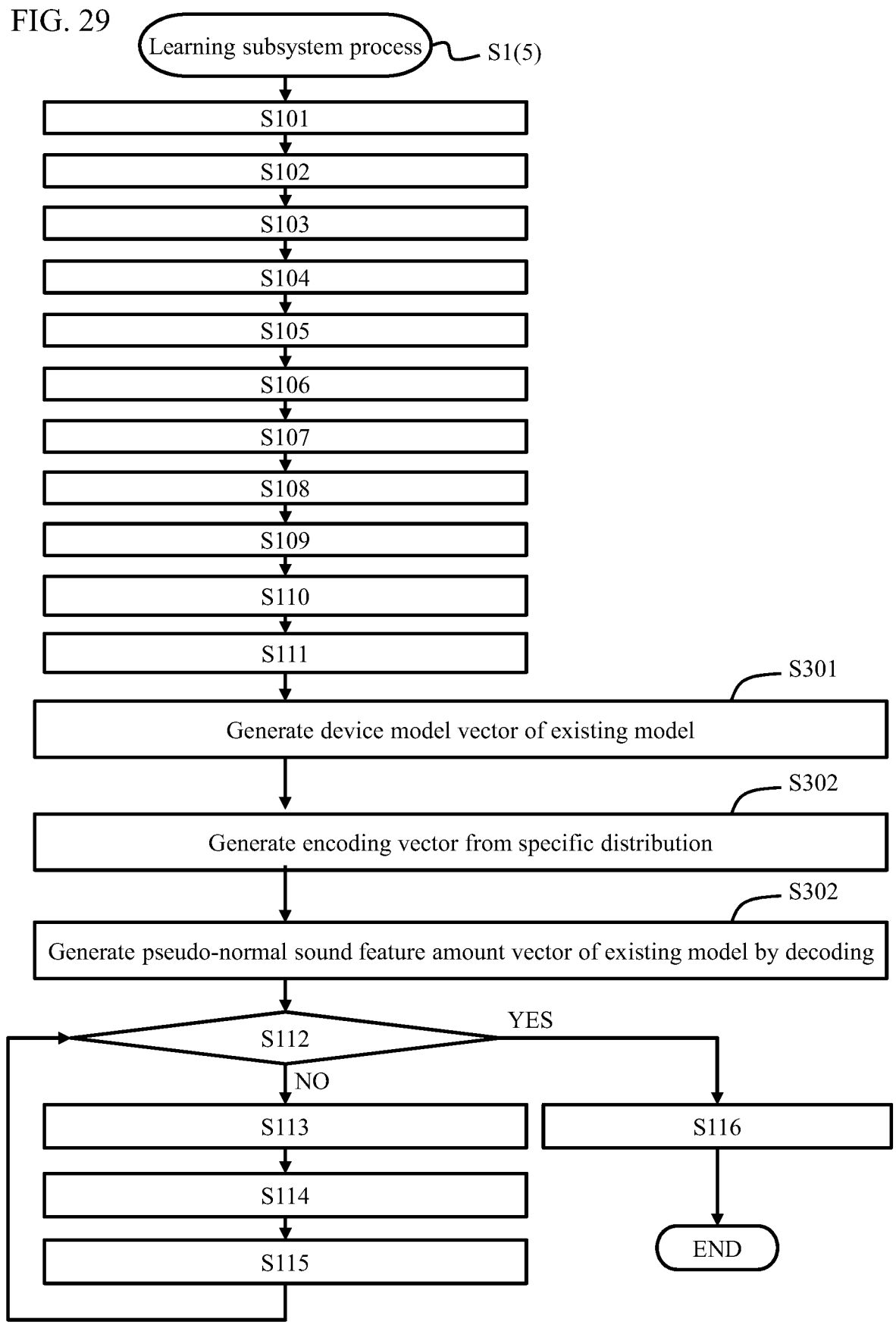
FIG. 29 is a processing flow of a learning subsystem.

FIG. 25 is a block configuration diagram of the abnormality degree calculation system 1(5) according to the present embodiment. FIG. 26 is an explanatory diagram illustrating the relationship between the feature amount vector D1, the encoding vector D2, the decoding vector D3, the device model vector D4, and the device category vector D7. FIG. 27 is a block configuration diagram of the learning subsystem LSS. FIG. 28 is a block configuration diagram illustrating details of the pseudo-normal sound feature amount vector generation unit 17 illustrated in FIG. 27. FIG. 29 is a processing flow of the learning subsystem LSS.

As illustrated in FIG. 25, the abnormality degree calculation system 1(5) includes the learning subsystem LSS, the abnormality degree calculation subsystem DSS, a pre-learned learning model database DB2, a finely-tuned learning model database DB4, and a fine-tuning subsystem FTS (5) similarly to the abnormality degree calculation system 1(4) described in the fourth embodiment.

As illustrated in FIGS. 26, 27, and 28, the abnormality degree calculation system 1(5) of the present embodiment includes a pseudo-normal sound feature amount vector generation unit 17 that generates a pseudo-normal sound feature amount vector D1F as also illustrated in FIG. 27.

As illustrated in FIG. 28, the pseudo-normal sound feature amount vector generation unit 17 uses a decoding unit 173 that has been learned from the data of the existing device model. The encoding vector D2 probabilistically generated by the encoding unit 172 with a predetermined distribution such as an isotropic Gaussian distribution and the existing device model vector D4(5) generated by a vector generation unit 171 are input to the decoding unit 173.

The existing device model vector generation unit 171 generates a device model vector D7 in which only one of all elements of the existing device model vector D4 is set to "1", and inputs the same to the decoding unit 173.

As a result, the decoding unit 173, which has learned about the existing device model, generates the pseudo-normal sound feature amount vector D1F related to the existing device model.

The pseudo-normal sound feature amount vector D1F is input to the encoding unit 12 as the feature amount vector D1. The feature amount vector DIN extracted from the learning data of an unknown device model (newly added device model) is also input to the encoding unit 12 as the feature amount vector D1.

FIG. 27 is a block configuration diagram of the learning subsystem LSS. FIG. 28 is a block configuration diagram illustrating details of the pseudo-normal sound feature amount vector generation unit 17 illustrated in FIG. 27. FIG. 29 is a processing flow of the learning subsystem LSS.

In the present embodiment, a learned model is finely-tuned using the pseudo-normal sound feature amount vector D1F for the existing device model and the feature amount vector DIN extracted from the learning data of an unknown device model.

In fine tuning, when the pseudo-normal sound feature amount vector D1F of the existing device model is input to the decoding unit 173, the device model vector D4(5) in which the element of the corresponding device model is "1" and the device category vector D7(5) in which the element of the corresponding device category is "1" are also input to the decoding unit 173.

The present embodiment configured in this way also has the same effect as that of the first embodiment and the third embodiment. Further, in the present embodiment, it is possible to generate a pseudo-normal sound feature amount vector D1F related to an existing device model using the decoding unit 173 that has learned about an existing device model. Therefore, according to the present embodiment, so-called catastrophic forgetting can be prevented without retaining the learning data of the existing device model.

That is, continuously storing the learning data of a known device model increases the cost in terms of database capacity and the like. On the other hand, if fine tuning is performed using only the learning data of an unknown device model, since the properties of the existing device model are gradually forgotten, the generalization accuracy is lowered. Therefore, in the present embodiment, the feature amount vector D1F of the existing device model is pseudo-generated (Generative replay). Due to this, in the present embodiment, it is possible to prevent forgetting the properties of the existing device model without continuously storing the learning data of the known device model, and it is possible to maintain the generalization accuracy.

The present invention is not limited to the above-described embodiments and may include various modifications. For example, the embodiments described above have been described in detail for easy explanation of the present invention and are not necessarily limited to those having all constituent elements described above. Moreover, a portion of the constituent elements of a certain embodiment may be replaced with a constituent element of the other embodiment and a constituent element of a certain embodiment may be added to a constituent element of the other embodiment. Moreover, other constituent elements may be added to a portion of the constituent elements of the respective embodiments, and the portion of the constituent elements may be removed or replaced.

The present invention is also applicable to, for example, the security field. It is possible to learn sounds in a normal state in homes, offices, and various facilities as normal sounds, and detect sudden sounds (for example, gunshot, falling sound of a person or object, screaming, alarm, and the like) other than normal sounds as abnormal sounds.

Further, the present invention can also detect whether there is an abnormality from vibration instead of sound. As described above, a vibration sensor (an acceleration sensor or the like) may be used as the sensor unit 21.

Further, instead of deleting the intermediate feature amount vector D3 from the feature amount vector D1, an arithmetic result for a predetermined intermediate region of the feature amount vector D1 may be weighted.

Furthermore, a part or all of the respective constituent elements, functions, processing units, processing means, and the like may be implemented by hardware such as designing a part or all of them by, for example, an integrated circuit. Furthermore, the respective constituent elements, functions, and the like may be implemented by software in such a way that a processor analyzes and executes programs that implement the respective functions. Information such as programs, tables, and files that realize each function may be stored in a recording device such as a memory, a hard disk, or an SSD (Solid State Drive) or a recording medium such as an IC card, an SD card, or a DVD.

Moreover, control lines and information lines which are considered to be necessary for explanation are illustrated, and it cannot be said that all control lines and information lines are not always necessary to manufacture a product.

Actually, it may be considered that substantially all constituent elements are connected to each other.

Each component of the present invention can be arbitrarily selected, and an invention having the selected configuration is also included in the present invention. Further, the configurations described in the claims can be combined in addition to the combinations specified in the claims.

What is claimed is:

1. An abnormality degree calculation system calculating a degree of abnormality of a target device, comprising:
    a memory;
    a communication interface that is communicatively coupled to a sensor; and
    a processor that is communicatively coupled to the memory and the communication interface,
    wherein the processor is configured to:
    receive, using the communication interface, an input signal originating from vibration of the target device via the sensor,
    generate a feature amount vector from the input signal originating,
    generate an encoding vector using a first neural network, wherein the first neural network is configured to receive as an input a set composed of the feature amount vector and a device type vector representing a type of the target device and output the encoding vector,
    generate a decoding vector using a second neural network, wherein the second neural network is configured to receive as an input the encoding vector and the device type vector and output the decoding vector,
    learn parameters of the first neural network and parameters of the second neural network so as to minimize a predetermined loss function defined as a function of the feature amount vector, the encoding vector nit, and the decoding vector; and
    calculate the degree of the abnormality, wherein the degree of the abnormality is defined as the function of the feature amount vector, the encoding vector, and the decoding vector.

2. The abnormality degree calculation system according to claim 1,
    wherein the feature amount vector is a post-loss feature amount vector, in which an intermediate feature amount vector in a predetermined intermediate region of the feature amount vector of the input signal is removed,
    wherein the processor is further configured to:
    generate a second encoding vector that is capable of restoring the intermediate feature amount vector removed, wherein the second encoding vector is generated using the first neural network where the input is a set composed of the post-loss feature amount vector and the device type vector and the output is the second encoding vector, and
    generate a second decoding vector that is a restored intermediate feature amount vector, wherein second decoding vector is generated using the second neural network where the an input the second encoding vector and the device type vector and the output is as the second decoding vector.

3. The abnormality degree calculation system according to claim 2, wherein the predetermined intermediate region is any one of
    a region of a predetermined time before and after a center on a time axis of the feature amount vector of the input signal,
    a region of a predetermined proportion before and after a center in a total time length of the feature amount vector of the input signal, and
    a region containing either a signal immediately before change in a state of the target device or a signal immediately after change in the state, when the state of the target device changes.

4. The abnormality degree calculation system according to claim 1, wherein
    the device type vector includes a device model vector indicating a model of the target device.

5. The abnormality degree calculation system according to claim 4, wherein
    the device type vector includes the device model vector and a device category vector indicating a category to which the target device belongs.

6. The abnormality degree calculation system according to claim 5, wherein
    the device model vector and the device category vector are represented as a One Hot vector in which only one of all elements constituting the vector is set to "1" and other elements are set to "0".

7. The abnormality degree calculation system according to claim 6, wherein
    The processor is configured to set an element, which is set to "0" in the device model vector, to "1" according to a predetermined probability and sets an element, which is set to "1" in the device model vector, to "0" according to another predetermined probability during an iterative process of learning the parameters of the first neural network and the parameters of the second neural network.

8. The abnormality degree calculation system according to claim 5, wherein
    the device model vector and the device category vector are represented by a fixed-length bit sequence generated by a hash function that receives as an input a device model and a fixed-length bit sequence generated by a hash function that receives as an input a device category, respectively.

9. The abnormality degree calculation system according to claim 4, wherein
    the device model vector includes an existing model corresponding portion configured to correspond to an existing device model and an unknown model corresponding portion configured to correspond to an unknown device model that can be added.

10. The abnormality degree calculation system according to claim 9, further comprising a pseudo-normal sound feature amount vector generation unit configured to pseudo-generate a normal sound feature amount vector of a device of an existing model, wherein the processor further:
    finely tunes the parameters of the first neural network and the parameters of the second neural network by using a pseudo-normal sound feature amount vector generated by the pseudo-normal sound feature amount vector generation unit and the feature amount vector of the device of an unknown type.

11. The abnormality degree calculation system according to claim 10, wherein
    the pseudo-normal sound feature amount vector generation unit generates the pseudo-normal sound feature amount vector by giving the encoding vector probabilistically generated according to a predetermined distribution and the device model vector, in which "1" is set to one element corresponding to a probabilistically generated encoding vector among all elements of an existing type corresponding portion, to the second neural network that has learned based on the feature amount vector of the device of an existing type.

12. An abnormality degree calculation method that calculates a degree of abnormality of a target device, the method comprising:
   receiving, by a processor, an input signal originating from vibration of the target;
   generating, by the processor, a feature amount vector from the input signal;
   generating, by the processor, an encoding vector using a first neural network, wherein the first neural network is configured to receive as an input a set composed of the feature amount vector and a device type vector representing a type of the target device and output the encoding vector;
   generating, by the processor, a decoding vector using a second neural network, wherein the second neural network is configured to receive as an input the encoding vector and the device type vector and output the decoding vector;
   learn, by the processor, parameters of the first neural network and parameters of the second neural network so as to minimize a predetermined loss function defined as a function of the feature amount vector, the encoding vector, and the decoding vector; and
   calculate the degree of the abnormality, wherein the degree of the abnormality is defined as the function of the feature amount vector, the encoding vector, and the decoding vector.

13. The abnormality degree calculation method according to claim 12, wherein the feature amount vector is a post-loss feature amount vector, in which an intermediate feature amount vector in a predetermined intermediate region of the feature amount vector of the input signal is removed
   wherein the method further comprises:
   generating, by the processor, a second encoding vector that is capable of restoring the intermediate feature amount vector removed, wherein the second encoding vector is generated using the first neural network where the input is a set composed of the post-loss feature amount vector and the device type vector and the output is the second encoding vector, and
   generating, by the processor, a second decoding vector that is a restored intermediate feature amount vector, wherein second decoding vector is generated using the second neural network where the input is the second encoding vector and the device type vector and the output is the second decoding vector.

14. The abnormality degree calculation method according to claim 12, wherein
   the device type vector includes a device model vector indicating a model of the target device.

15. The abnormality degree calculation method according to claim 14, wherein
   the device type vector includes the device model vector and a device category vector indicating a category to which the target device belongs.

16. The abnormality degree calculation method according to claim 15, wherein
   the device model vector includes an existing model corresponding portion configured to correspond to an existing device model and an unknown model corresponding portion configured to correspond to an unknown device model that can be added.

* * * * *